United States Patent
Plut

(10) Patent No.: US 8,269,902 B2
(45) Date of Patent: Sep. 18, 2012

(54) MULTIMEDIA PROJECTION MANAGEMENT

(75) Inventor: William J. Plut, Los Altos, CA (US)

(73) Assignee: Transpacific Image, LLC, Wilmington, DE (US)

( * ) Notice: Subject to any disclaimer, the term of this patent is extended or adjusted under 35 U.S.C. 154(b) by 598 days.

(21) Appl. No.: 12/477,486

(22) Filed: Jun. 3, 2009

(65) Prior Publication Data

US 2010/0309390 A1    Dec. 9, 2010

(51) Int. Cl.
| | |
|---|---|
| H04N 7/18 | (2006.01) |
| H04N 9/31 | (2006.01) |
| H04N 5/64 | (2006.01) |
| H04N 3/22 | (2006.01) |
| H04N 3/26 | (2006.01) |

(52) U.S. Cl. ......... 348/745; 348/744; 348/840; 348/143
(58) Field of Classification Search .................... 348/115
See application file for complete search history.

(56) References Cited

U.S. PATENT DOCUMENTS

| | | | | |
|---|---|---|---|---|
| 6,219,011 | B1 * | 4/2001 | Aloni et al. .................... | 345/1.3 |
| 2005/0041000 | A1 | 2/2005 | Plut | |
| 2005/0052623 | A1 | 3/2005 | Hsiung | |
| 2005/0254662 | A1 * | 11/2005 | Blank et al. .................... | 381/58 |
| 2005/0264857 | A1 * | 12/2005 | Vesely et al. .................... | 359/13 |
| 2005/0280603 | A1 * | 12/2005 | Aughey et al. .................... | 345/8 |
| 2007/0070296 | A1 * | 3/2007 | Iwanaga .................... | 353/31 |
| 2008/0043100 | A1 * | 2/2008 | Sobel et al. .................... | 348/139 |
| 2008/0062196 | A1 * | 3/2008 | Rackham .................... | 345/619 |

FOREIGN PATENT DOCUMENTS

| | | |
|---|---|---|
| EP | 2187259 A1 | 5/2010 |
| FR | 2 913 552 A1 | 9/2008 |
| WO | 0241664 A2 | 5/2002 |
| WO | 2007/104533 A1 | 9/2007 |
| WO | 2008102970 A1 | 8/2008 |
| WO | 2009034694 A1 | 3/2009 |

OTHER PUBLICATIONS

Partial Search Report mailed Jul. 23, 2010 for International Application No. PCT/US2010/020223, 2 pages.

International Search Report and Written Opinion for International Application No. PCT/US2010/030223, mailing date Dec. 29, 2010, 20 pages.

* cited by examiner

*Primary Examiner* — Justin Shepard

(74) *Attorney, Agent, or Firm* — Turocy & Watson, LLP

(57) ABSTRACT

System and methods for outputting coordinated audio and video presentations are provided. The system includes a plurality of speakers and a display device capable of providing a plurality of projection images. Sound generated by the plurality of speakers is coordinated with the plurality of projection images. The coordination process may be automatically performed according to position change of the plurality of projection images. Sound generated by the plurality of speakers may be further modulated according to position of a user or motion of a video object being displayed in one or more of the plurality of projected images.

24 Claims, 31 Drawing Sheets

MULTIMEDIA PROJECTION MANAGEMENT

BACKGROUND

One of the major characteristics of projection-type display devices is their ability to display images that are larger in size than images produced by other displays such as CRT (cathode-ray tube) or LCD (liquid crystal display). Projection-type display devices have relatively smaller size compared to the image capable of being projected. However, many unique characteristics of projection-type displays are largely unexploited. For example, conventional projection-type display devices are designed in a fixed traditional mindset, such as single video output per device.

In general, a projection-type display or video projector displays an image that corresponds to a video signal upon a projection screen or other surface (e.g., wall). Most modern devices are capable of correcting distortion, curves, focus, and other inconsistencies by way of manual controls. Traditionally, these video projection devices are used for business presentations, classroom training, home theater, etc. For example, projection devices are widely used in many schools and institutions to project onto an interactive white board during the course of teaching students.

Although projection-type display devices were initially developed to display presentations (e.g., business, education), today, these projection devices have become commonplace for home theaters. For example, many households today include home theaters specifically designed to view motion pictures upon a projection screen. These theaters are often equipped with a projection-type display device. In addition to home theatre applications, the relative large size of projection images is able to be utilized in virtual reality applications, such as stereoscopic video output, peripheral or near peripheral videos, which are of a developing area potentially going to take an important part of the display industry.

DETAILED DESCRIPTION

Figure 1:
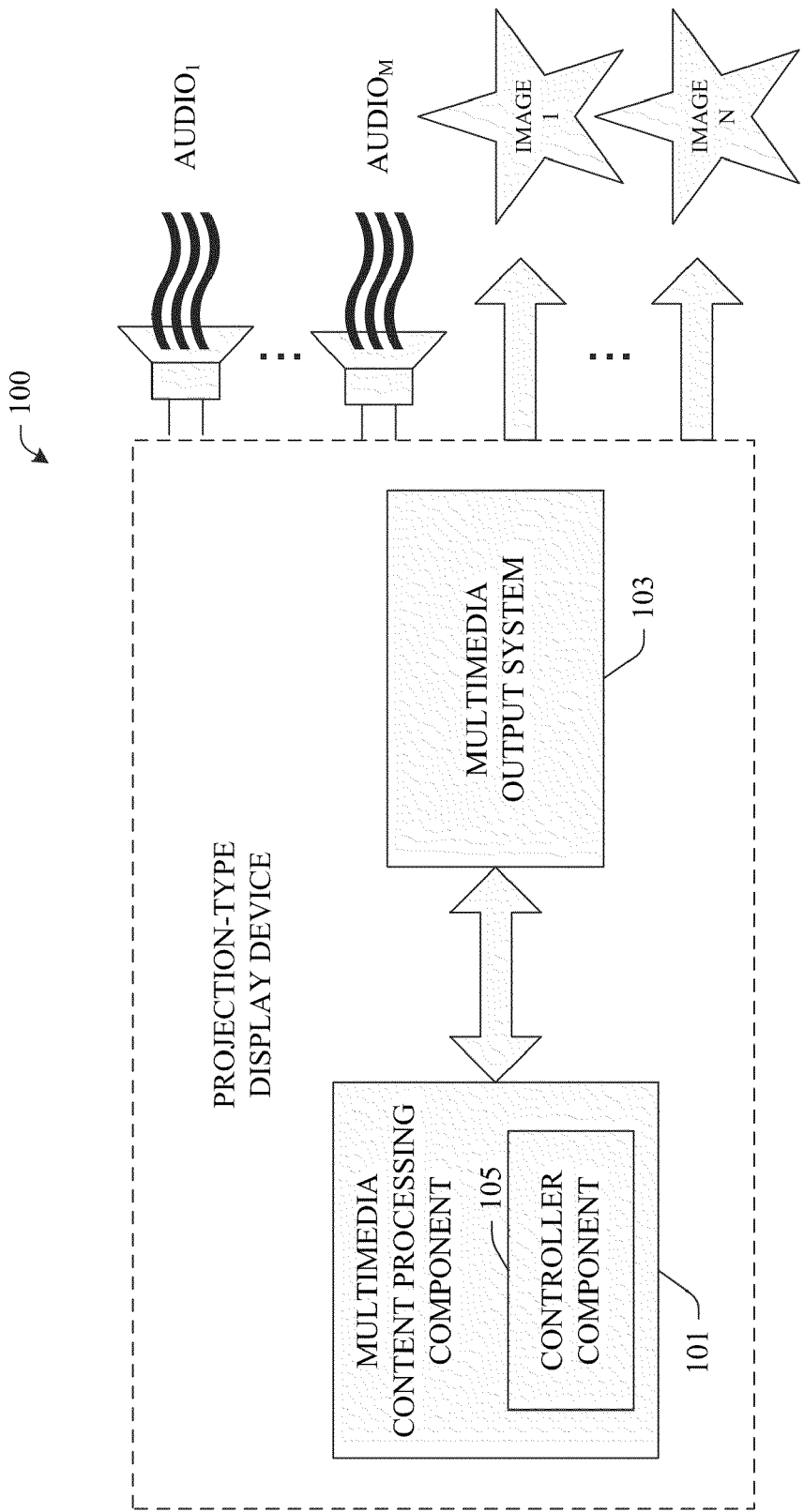
FIG. 1 illustrates an example system that facilitates multimedia projection in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

As used in this application, the terms "component," "unit," "module" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

As used herein, the term to "infer" or "inference" refer generally to the process of reasoning about or inferring states of the system, environment, and/or user from a set of observations as captured via events and/or data. Inference may be employed to identify a specific context or action, or may generate a probability distribution over states, for example. The inference may be probabilistic-that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an example system 100 that facilitates multimedia projection output in accordance with aspects of the innovation. Generally, the system 100 may include a multimedia content processing component 101 and a multimedia output system 103 that together are capable of coordinating video and audio output via a projection system. A controller component 105 may be, for example, a control software, circuitry (or combination thereof) capable of establishing spatial coordination, thermal control, image coordination, distortion correction or the like.

The innovation disclosed and claimed herein, in aspects thereof, comprises a projection system (e.g., 100) that displays a plurality of images upon a single or a plurality of surfaces together with accompanying audio. For example, the system may provide a multimedia surround video and sound experience that includes 1 to M audio signals and 1 to N image signals, where M and N are integers. As will be described below, in aspects, a switch may be provided that selectively diverts light to each of a plurality of projection chambers, for example, in accordance with predetermined video data. The plurality of projection chambers may facilitate projection upon multiple surfaces to create a multi-dimensional experience. A content processing component 101 enables the multiple projection chambers to display multiple images upon a single or multiple surfaces simultaneously together with audio.

In this regard, it is noted at the outset that any of the embodiments described herein in the context of multiple chambers can be provided more generally as multiple projection outputs without constraining each light source to a 'chamber'. For the avoidance of doubt, such implementations employing chambers should not be considered limiting on the more general notions presented herein, such as digital switching among multiple colored light projection outputs.

In other aspects of the innovation, the system 100 may dynamically detect motion or location of a user (or other object) thereby automatically adjusting to enhance a multimedia experience (e.g., virtual reality). Other aspects may dynamically monitor a viewer's eye movement thereby automatically adjusting to optimize the visual and sound experience (e.g., line of sight). In yet other aspects thereof, an artificial intelligence or machine learning & reasoning (MLR) component is provided that employs a probabilistic and/or statistical-based analysis to prognose or infer an action that a user desires to be automatically performed.

Figure 2:
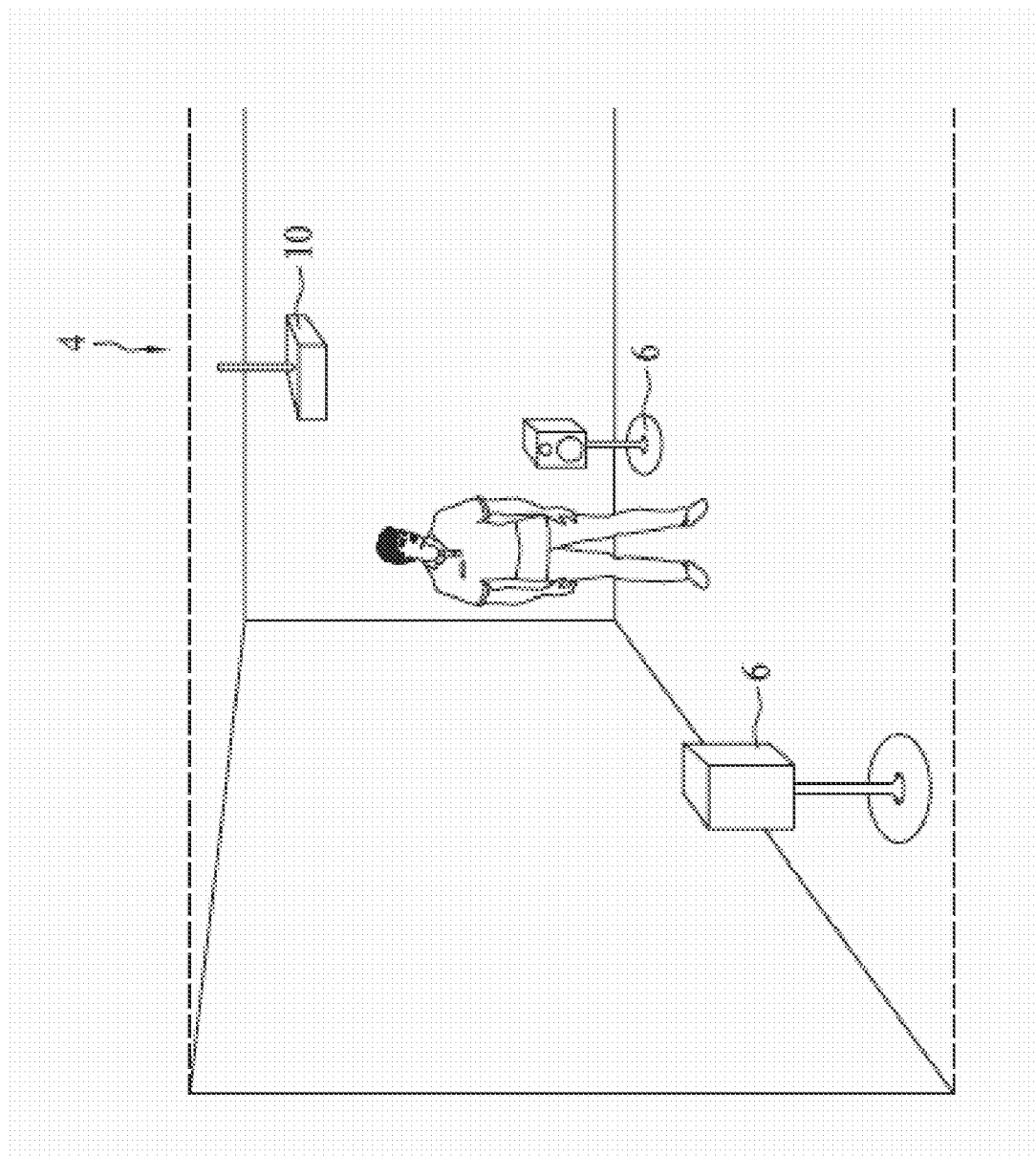
FIG. 2 illustrates an example configuration of a multimedia output system and environment in accordance with aspects of the innovation.

Referring now to FIG. 2, an exemplary configuration of multimedia output system 4 is shown. As illustrated, output system 4 may include a display device 10 and a plurality of speakers 6, for example, in an environment where a virtual reality space may be presented to a user. It is to be appreciated that greater immersion around a user's periphery allows for increasing entertainment and experience from the virtual reality space with peripheral or near-peripheral surrounding video and audio. Several embodiments are described in the following paragraphs for presenting details regarding to the multimedia output system 4.

Figure 3:
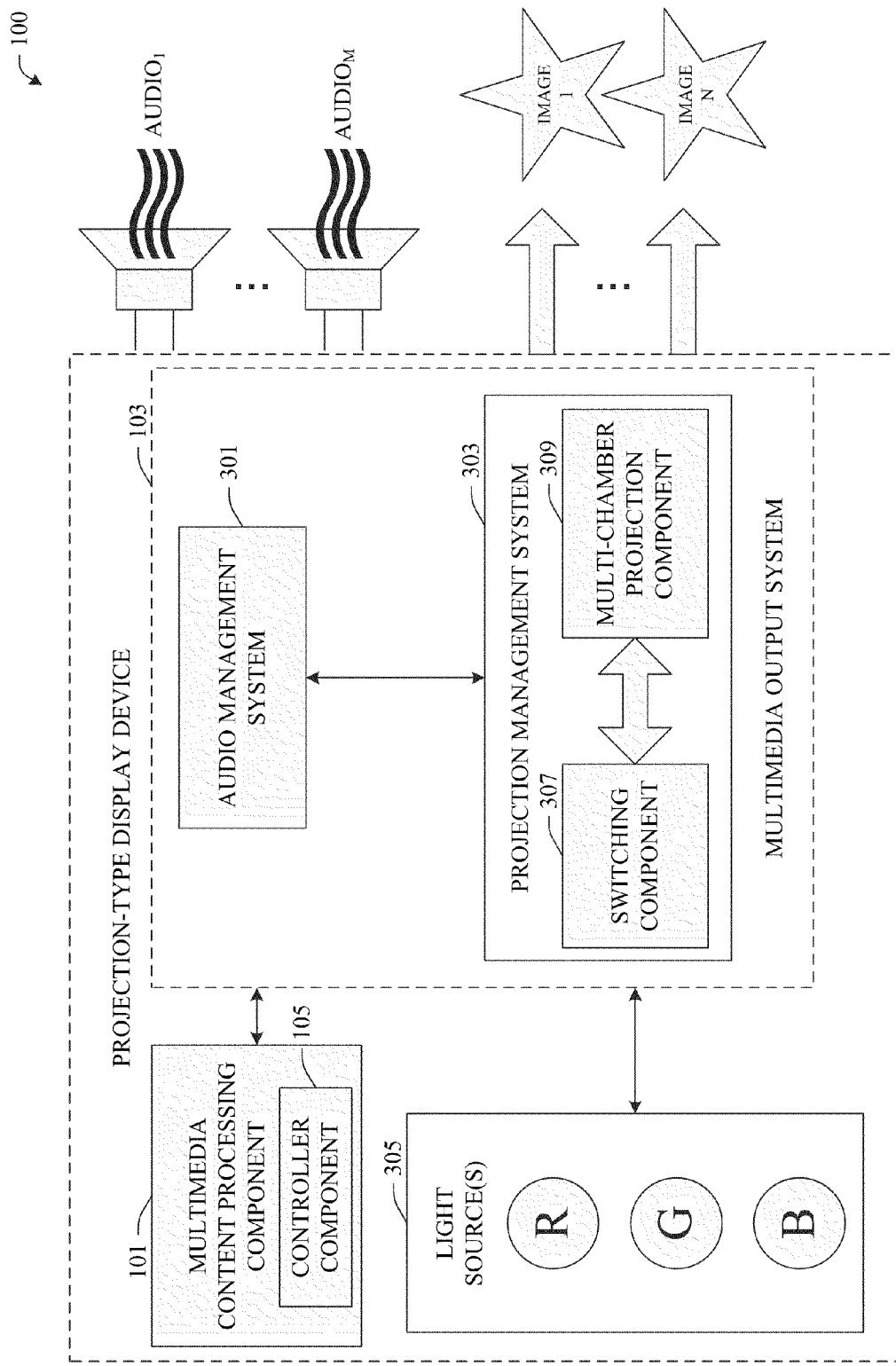
FIG. 3 illustrates an example alternative system that facilitates multimedia projection in accordance with aspects of the innovation.

FIG. 3 illustrates an alternative example block diagram of system 100 in accordance with aspects of the innovation. As shown, multimedia output system 103 may include an audio management system 301 and a projection management system 303 that communicates with a light source 305. In operation, the projection management system 303 may include a switching component 307 that regulates light from light source 305 to a plurality of projection outputs, such as chambers, within the multi-output or chamber projection component 309. In operation, together, these sub-components (307, 309) facilitate simultaneous projection of multiple images from a single projection-type display device 100. Additionally, the audio management component 301 enables coordination and rendering of audio streams and data that accompany images rendered via projection outputs or chambers.

As shown in FIG. 3, the light source may include multiple sources, for example, a red, green and blue sets as illustrated in the example. Each set may include one or more lasers or light emitting diodes (LEDs). The switching component 307 may direct or route the red laser, the green laser and the blue laser in a predetermined order to each of the outputs/chambers within the multi-output/chamber projection component 309. In other words, in one example, the switching component 307 may direct light in an alternating, sequential, cyclical or other determined order such that each output/chamber may share light generated from an individual source. It will be understood that, while the projection-type display device 100 may employ multiple projection outputs/chambers (309) to generate multiple images, light sources 305 may be shared between the outputs/chambers thereby not requiring dedicated light sources for each projection output/chamber.

As will be described in greater detail infra, the controller component 105 may effect spatial coordination. For example, a user's position may be detected or otherwise determined (or inferred)—thereafter, the system may dynamically adjust video and/or audio so as to enhance the user experience. In one example, volume may be increased or decreased as appropriate. In other aspects, audio channels may be activated or deactivated as appropriate. Similarly, rendered video images may also be dynamically controlled in accordance with a user location, eye movements, interests, line of sight, etc.

The control component 105 may also manage image coordination (e.g., alignment, focus) as well as distortion correction (e.g., Keystone correction.). These and other aspects will be described in greater detail below.

Figure 4:
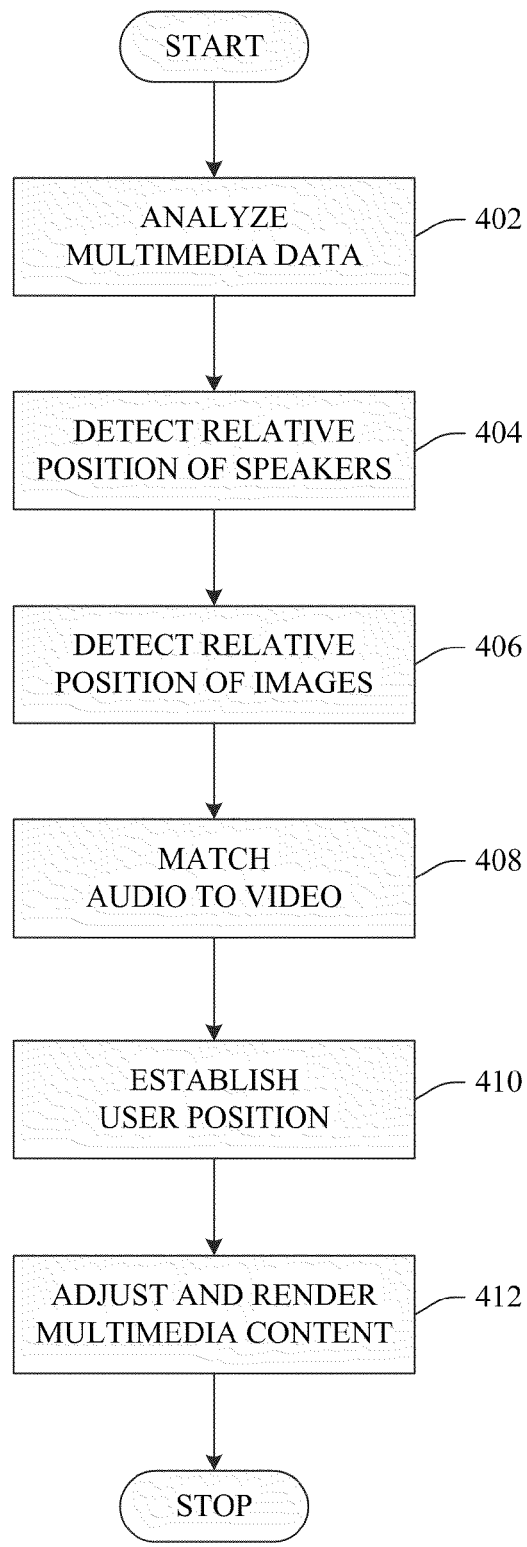
FIG. 4 illustrates an example flow chart of procedures that facilitate multimedia projection in accordance with aspects of the innovation.

FIG. 4 illustrates a methodology of rendering multimedia content in accordance with aspects of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 402, multimedia data is analyzed to establish video and audio data. Relative positions of speakers (or sound devices) are detected or otherwise established at 404. Similarly, relative positions of projected images are detected at 406. At 408, audio is matched to video (and/or vice versa) so as to establish a coordinated multimedia data stream. It will be appreciated that the matching of audio to video may be established based at least in part upon the results of data analysis from 402.

Optionally, at 410, a position of a user may be established. In aspects, sensors including, but not limited to, motion detectors, eye movement monitors, microphones or the like may be employed to establish perspective, position as well as direction of attention of a user. In accordance therewith, the multimedia content may be adjusted or altered to compensate for the user perspective. For example, volume from a subset of the speakers may be escalated so as to enhance user experience. Ultimately, the multimedia content may be rendered at 412. These and other aspects will be better understood upon a review of the disclosure directed to the figures that follow.

Figure 5:
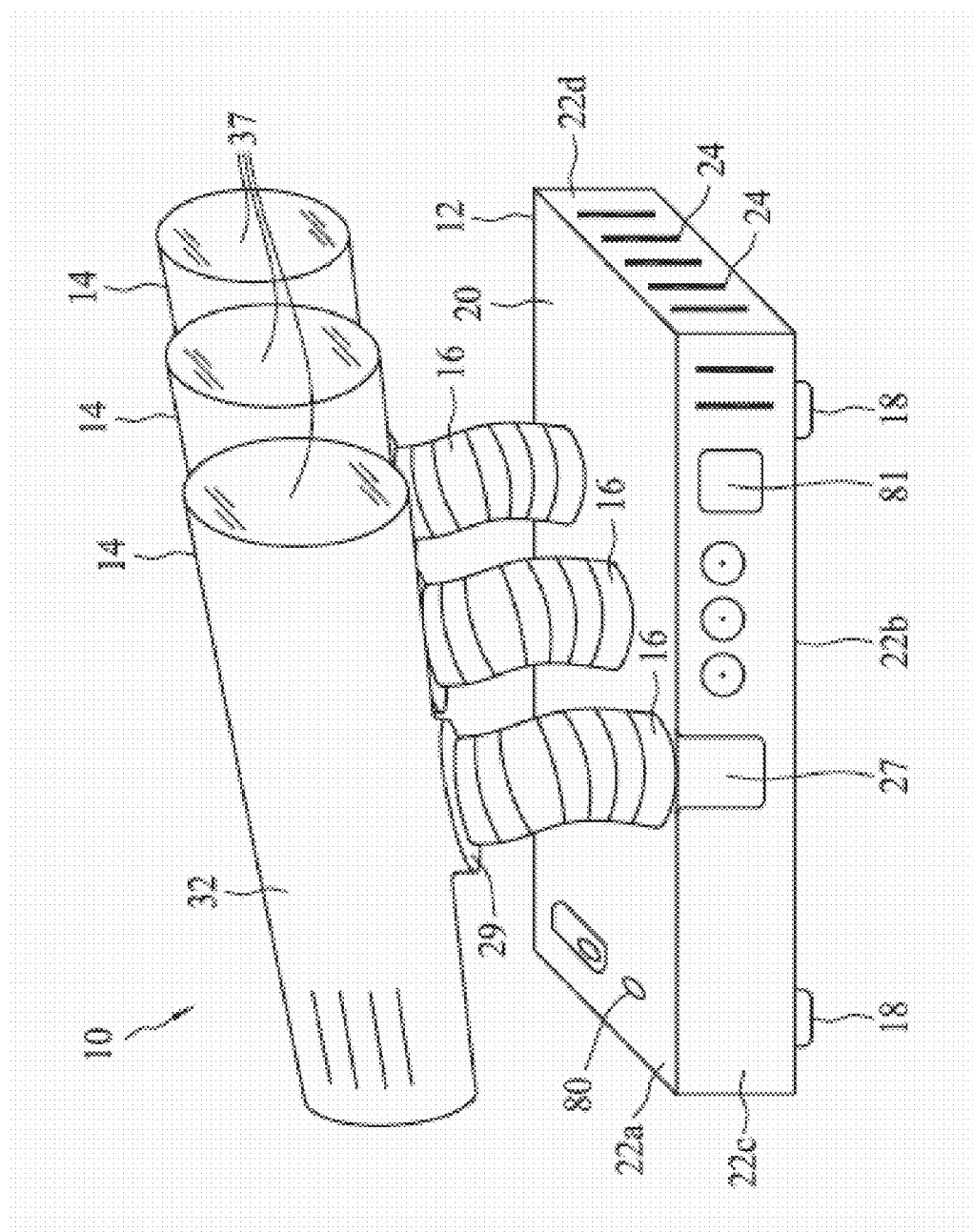
FIG. 5 illustrates a perspective view of a display device in accordance with one of the embodiments.

FIG. 5 illustrates a top perspective view of a display device 10 in accordance with one of the present embodiments. Display device 10 is capable of producing and projecting one or more video images on one or more receiving surfaces. As shown, display device 10 comprises a base 12, a plurality of projection outputs/chambers 14 that each include a separate projection output, and a plurality of positional interfaces 16.

Base 12 is configured to maintain position of display device 10, e.g., relative to a stationary object. In embodiments, base 12 includes a relatively flat bottom that allows display device 10 to rest upon a flat surface such as a table or desk. One or more high friction pads 18 attach to a bottom surface 22b of base 12 to increase static friction with the flat surface. Base 12 may also comprise a receiving slot 27 that allows modular attachment of functional accessories for display device 10. For example, slot 27 may receive a clip attachment that comprises a spring-powered clip for clamping base 12 onto a stationary object. This allows base 12 and display device 10 to be mounted on non-flat or non-horizontal surfaces such as vertical walls of bookshelves and cubicles, and personal clothing or accessories such as belts or straps, for example. Base 12 may also comprise another slot on its bottom side, dimensioned the same, to permit reception of the functional accessories on the bottom side of base 12.

A housing 20 protects internal components within base 12, defines outer dimensions of base 12, and defines dimensions of an inner light source output/chamber. As shown, housing 20 is about rectangular and comprises four sidewalls 22c-f (only facing sidewalls 22c and 22d are shown in FIG. 5), top wall 22a, and bottom wall 22b. Walls 22 comprise a suitably rigid material that grants structural rigidity for base 12 and mechanical protection for internal components within housing 20. A lightweight and rigid plastic or aluminum is suitable in this regard. One or more walls of housing 20 may also include air vents 24 that allow air flow between the inner output/chamber and an environment external to housing 20. In other embodiments, housing 20 includes a more rounded or contoured shape than that shown in FIG. 5 and does not include orthogonal walls or a rectangular shape.

Projection chamber 14 includes components responsible for the production of images based on received light and received video data, and components responsible for the projection of those images. Projection chamber 14 comprises a projection chamber housing 32, an optical modulation device (within projection chamber housing 32, not shown in FIG. 5), and an output projection lens system (within projection chamber housing 32, not shown in FIG. 5). The optical modulation device selectively transmits light generated by a light source in base 12 according to video data included in a video signal provided to the optical modulation device, and will be described in further detail infra. The projection lens system outputs light transmitted by the optical modulation device along a projection path, and will also be described in further detail below.

In operation, a light source within base 12 generates light which is provided to the optical modulation device within projection chamber 14 as a luminous flux. In embodiments, one or more optical fibers transmit light from the light source within base 12 to the optical modulation device within projection chamber 14. The optical modulation device selectively transmits light according to video data in a signal that corresponds to an image to be projected. The projection lens system enlarges and projects an image formed by the optical modulation device. Each image is cast with a splay angle such that the image enlarges as the distance to a receiving surface increases.

Projection chamber 14 comprises a projection chamber housing 32 that protects internal components of projection chamber 14; and defines outer and inner dimensions of projection chamber 14. As shown, projection chamber housing 32 is about cylindrical, except for an added receiving interface 29 on its bottom side. Projection chamber housing 32 has a cylindrical axis that is about collinear with output projection path. An output optical projection lens 37 of the projection lens system forms and seals the forward end of projection chamber 14.

In embodiments, the average diameter of cylindrical projection chamber housing 32 is relatively within ten percent of the diameter of output optical projection lens 37. In other embodiments, projection chamber housing 32 tapers slightly such that its forward end is slightly larger than an aft end, resulting in a slightly frustoconical shape where lens 37 constitutes the larger end.

It is to be understood that shape and design of projection chamber 14 may vary in other aspects. For example, forward end of projection chamber 14 may be rounded to accommodate a circular output lens 37 while aft end is cornered to accommodate a rectangular optical modulation device and associated support components that are locally contained better by a rectangular housing. Projection chamber housing 32 defines an inner chamber as described in further detail below. Projection chamber housing 32 comprises a suitably rigid material for structural rigidity of base 12 and internal component protection. A lightweight and rigid plastic or aluminum is suitable for several embodiments.

Receiving interface 29 is disposed on the lower side of projection chamber 14 and permits coupling between projection chamber 14 and positional interface 16. Receiving interface 29 also permits containment and protection of display device 10 components that do not entirely fit within projection chamber 14, or components that require spatial arrangements outside of projection chamber 14. In embodiments, receiving interface 29 comprises the same material as projection chamber housing 32 and extends the interior projection chamber provided by projection chamber housing 32.

Positional interface 16 allows projection chamber 14 to be moved relative to base 12, and allows projection chamber 14 to maintain a constant position relative to base 12 after being moved. Thus, positional interface 16 allows a user to point projection chamber 14 and manipulate the position of an output image projected by display device 10 with ease. In embodiments, positional interface 16 comprises a ball and socket combination that permits relative rotational movement between projection chamber 14 and base 12. In other embodiments, positional interface 16 comprises corrugated metal tubing that is sufficiently rigid to hold a position for projection chamber 14, while compliant enough for a user to bend the tubing to achieve a desired position and orientation for projection chamber 14.

Positional interface 16 couples to base 12 and couples to projection chamber 14. For the embodiments shown in FIG. 5, positional interface 16 comprises an upper end that attaches to projection chamber housing 32 and a lower end that attaches or couples to housing 20 of base 12. More specifically, a projection chamber housing 32 portion of receiving interface 29 allows attachment to upper end of positional interface 16, while a central portion of top wall 22a allows attachment to lower end of positional interface 16. As shown, positional interface 16 couples to projection chamber housing 32 at a location between an aft end of projection chamber 14 and a forward end that includes output optical projection lens 37.

In embodiments, upper end of positional interface 16 couples at a location relatively close to a center of mass of projection chamber 14 to minimize mechanical moments transmitted onto base 12, e.g., those resulting from a displacement of center of mass of projection chamber 14 away from a center of mass for base 12. In other embodiments, base 12 includes a recessed groove in top wall 22a that allows positional interface 16 to be folded or collapsed down into top wall 22a, thereby decreasing the profile of display device 10 during non-use.

Figure 6:
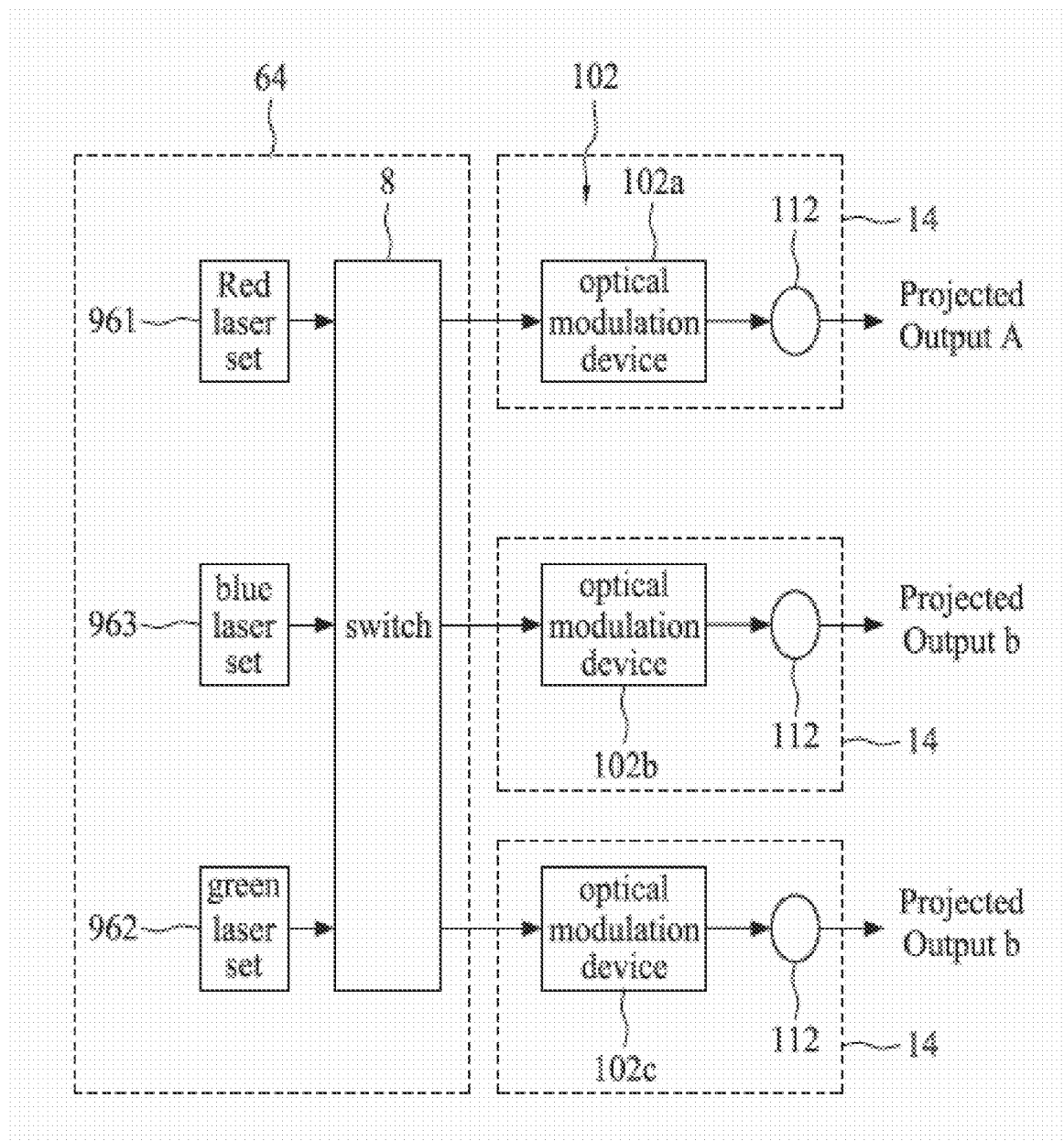
FIG. 6 is an example schematic chart showing a switch diverting light beams from light source into different projection outputs, such as projection chambers, in accordance with one of the embodiments.

Turning now to FIG. 6 an example schematic chart illustrating optical path from a light source 64 configured in base 12 (FIG. 5) to multiple projection outputs 107 such as each projection chamber 14 in accordance with one of the present embodiments is shown. Light source 64 includes a plurality of laser sets, such as a red laser set 961, a green laser set 962 and a blue laser set 963, generating a plurality of laser beams with different color to one another, such as red laser beam, green laser beam and blue laser beam. As shown in FIG. 6, light source 64 also includes a switch 8 which receives the red laser beam, green laser beam and blue laser beam from the red laser set 961, the green laser set 962 and the blue laser set 963 respectively.

In embodiments, display device 10 comprises three projection outputs 14. Each of the projection outputs 14 includes an optical modulation device 102 and a projection lens system 112. The optical modulation device 102 is configured to selectively transmit light generated by the light source according to a receiving video data. The projection lens system 112 is configured to output light transmitted by the optical modulation device 102 along a predetermined projection path, so as to display projection images on one or more external receiving surfaces.

The switch 8 is capable of diverting the red laser beam, the green laser beam and the blue laser beam in a predetermined sequential order to each of the three projection outputs 14. For instance, in embodiments, there are three modes corresponding to a first time frame, a second time frame and a third time frame, respectively.

The first mode—during the first time frame, red laser beam is transmitted from switch 8 to optical modulation device 102a; green laser beam is transmitted from switch 8 to optical modulation device 102b; blue laser beam is transmitted from switch 8 to optical modulation device 102c.

The second mode—during the second time frame, red laser beam is transmitted from switch 8 to optical modulation device 102c; green laser beam is transmitted from switch 8 to optical modulation device 102a; blue laser beam is transmitted from switch 8 to optical modulation device 102b.

The third mode—during a third time frame, red laser beam is transmitted from switch 8 to optical modulation device 102b; green laser beam is transmitted from switch 8 to optical modulation device 102c; blue laser beam is transmitted from switch 8 to optical modulation device 102a.

Lasting time of the first time frame, the second time frame and the third time frame may be identical to one another in embodiments. Namely, the first mode, the second mode and the third mode take turns evenly to be applied in the light source 64. In some other embodiments, lasting time of the first time frame, the second time frame and the third time frame may differ from one another according to system requirement. Such adjustment toward lasting time may be used as color control manner of the display device 10.

Figure 7:
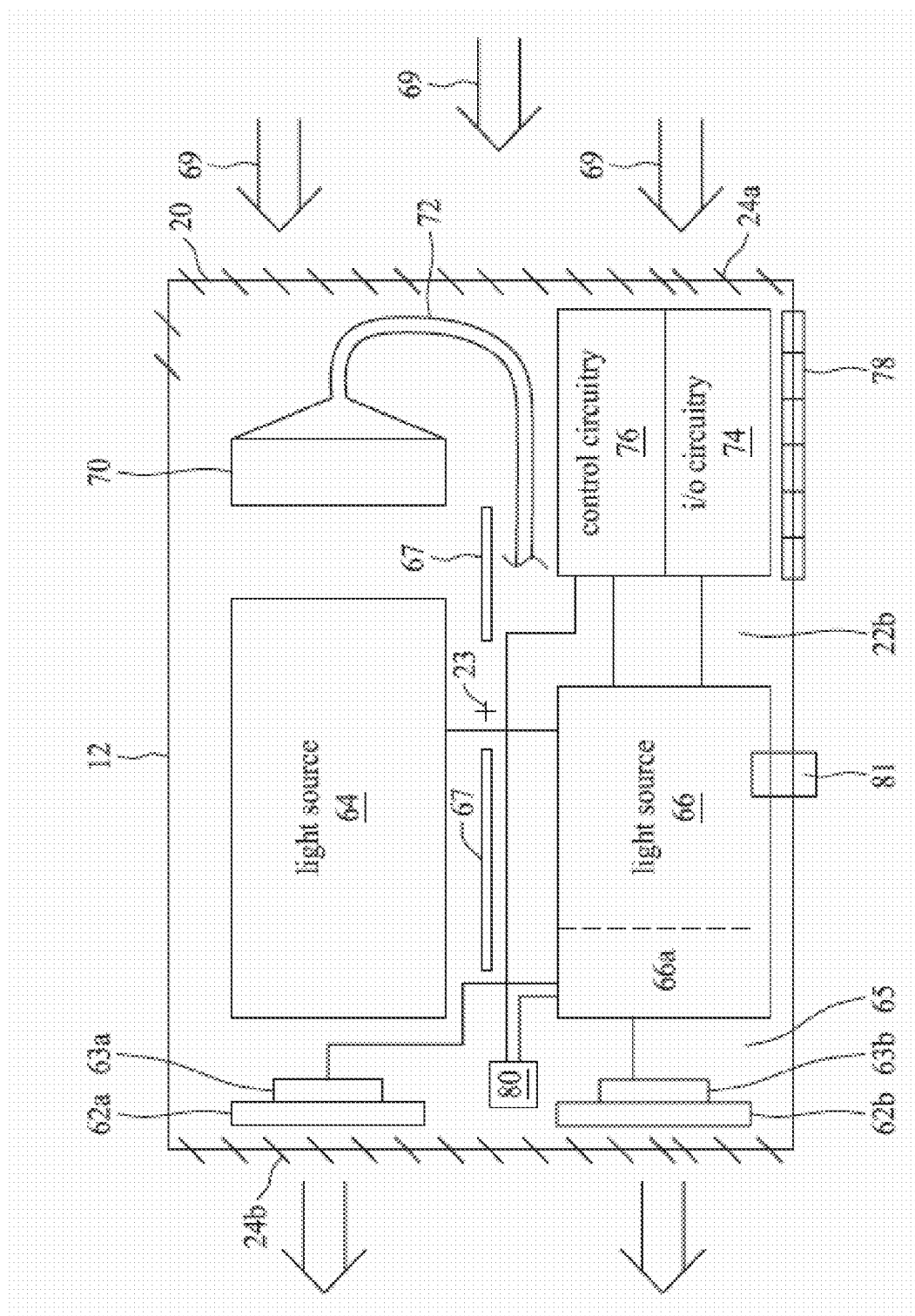
FIG. 7 illustrates a simplified schematic of components within base of a display device in accordance with some embodiments.

FIG. 7 illustrates a simplified top view schematic of components within base 12 in accordance with some embodiments. A light source output 65 is defined in volume and shape by inside walls 22a-f of base 12. Light source output 65 contains fans 62a and 62b, light source 64, power supply 66, fiber-optic interface 70, fiber-optic cable 72, input/output circuitry 74, control circuitry 76, and input/output interfaces 78. In embodiments, control circuitry 76 and input/output interface 78 are used for the whole multimedia output system 4. Namely, input/output interface 78 is configured to receive and output video data and also audio data; while control circuitry 76 is configured to control display device 10 and also audio output.

In embodiments, base 12 is designed or configured to maintain balance of display device 10. In this case, base 12 may be designed to maintain balance for any position of projection output 14 relative to base 12 while base 12 rests on a flat surface. Thus, components within base 12 may be arranged and situated such that they cumulatively provide a center of mass 23 relatively close to a geometric center for a footprint of base 12. As shown in FIG. 7, light source 64 and power supply 66, which are typically the heaviest components in base 12, are disposed relatively central to the footprint in one dimension and on opposite sides of center of mass 23 in the other dimension. In specific embodiments, components within base 12 are arranged within base 12 according to their weight in order to substantially balance moments about a center of mass 23. The exact position of each component will depend of on the number and type of components and base 12 layout. In addition, housing 20 may be sized to provide a wide enough footprint to balance moments produced by positions and orientations of projection output 14 away from a center of mass 23 for base 12.

Fans 62a and 62b move air through light source output 65 for cooling components within light source output 65. In embodiments, fans 62a and 62b draw air in through inlet air vents 24a on one side of base 12 and exhaust heated air out of exhaust air vents 24b after the air has cooled internal components of base 12 and walls of housing 20. One skilled in the art will appreciate that fans 62a and 62b, inlet air vents 24 and exhaust air vents 24b placement will vary with internal component placement within light source output 65. Specifically, fan 62a and 62b placement—and airflow patterns effected by fans 62 within light source output 65—is designed according to individual temperature regulation requirements and heat generation contributions of components within base 12. Light source 64 and power supply 66 generate the largest proportion of heat within base 12, while control circuitry 76 and input/output circuitry 74 call for tighter temperature regulation. Correspondingly, inlet air 69 passes in through inlet air vents 24a, initially passes and cools control circuitry 76 and input/output circuitry 74 while the air is relatively cool, passes across power supply 66 and light source 64, and exits out exhaust air vents 24b. The exhaust air may also cool fan motors 63a and 63b, which rotate fans 62a and 62b, respectively. In embodiments, multiple fans are used to permit a lower profile for base 12.

It is to be appreciated that the number and size of fans used will depend on heat generation within display device 10 and a desired air flow to maintain one or more heat dissipation goals. Light source output 65 may also include one or more vertical or horizontal airflow guides 67 within light source output 65 to direct and distribute airflow as desired. In embodiments, light source 64 comprises one or more diode laser arrays and one or more circuit boards to power and control the diode lasers. In this case, airflow guides 67 are arranged to direct cooling air across the surfaces of each circuit board. As will be described in further detail below, fans 62a and 62b may also be responsible for drawing air through positional interface 16 and to or from projection output 14 to cool the optical modulation device included therein.

Figure 8:
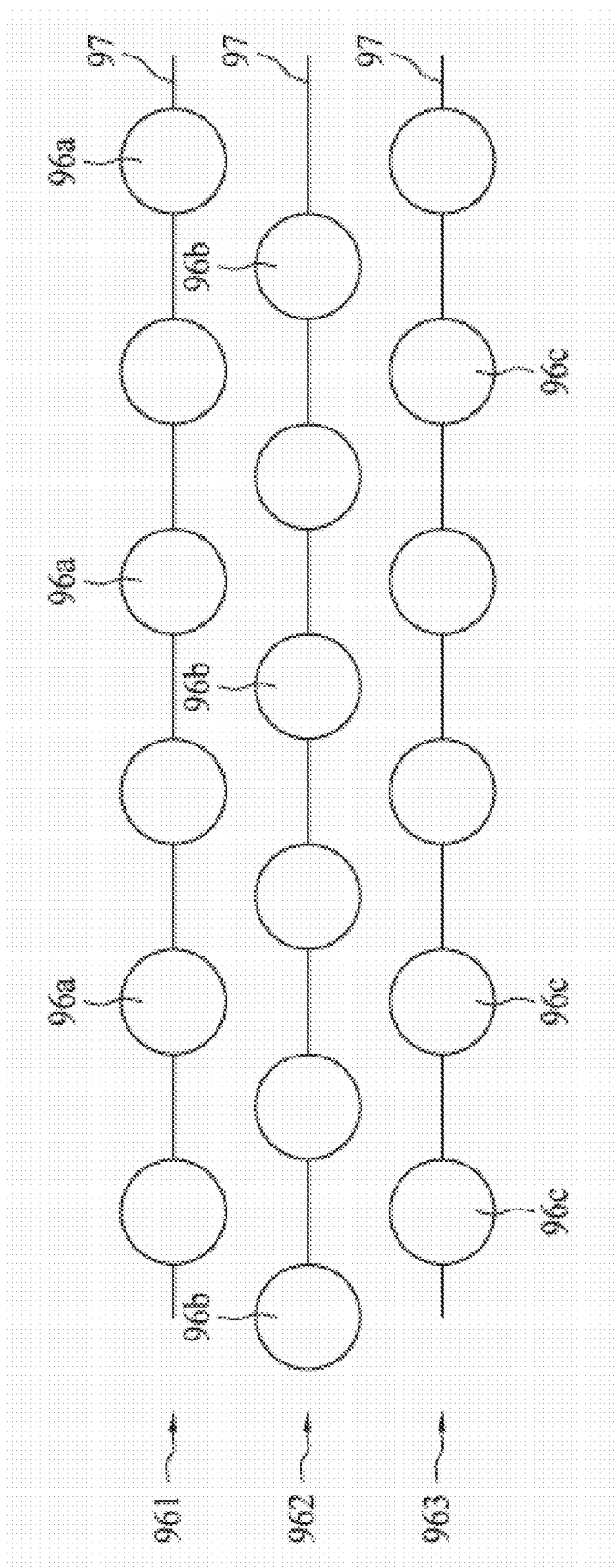
FIG. 8 illustrates simplified front view of an example light source configuration in accordance with some embodiments.
Figure 9:
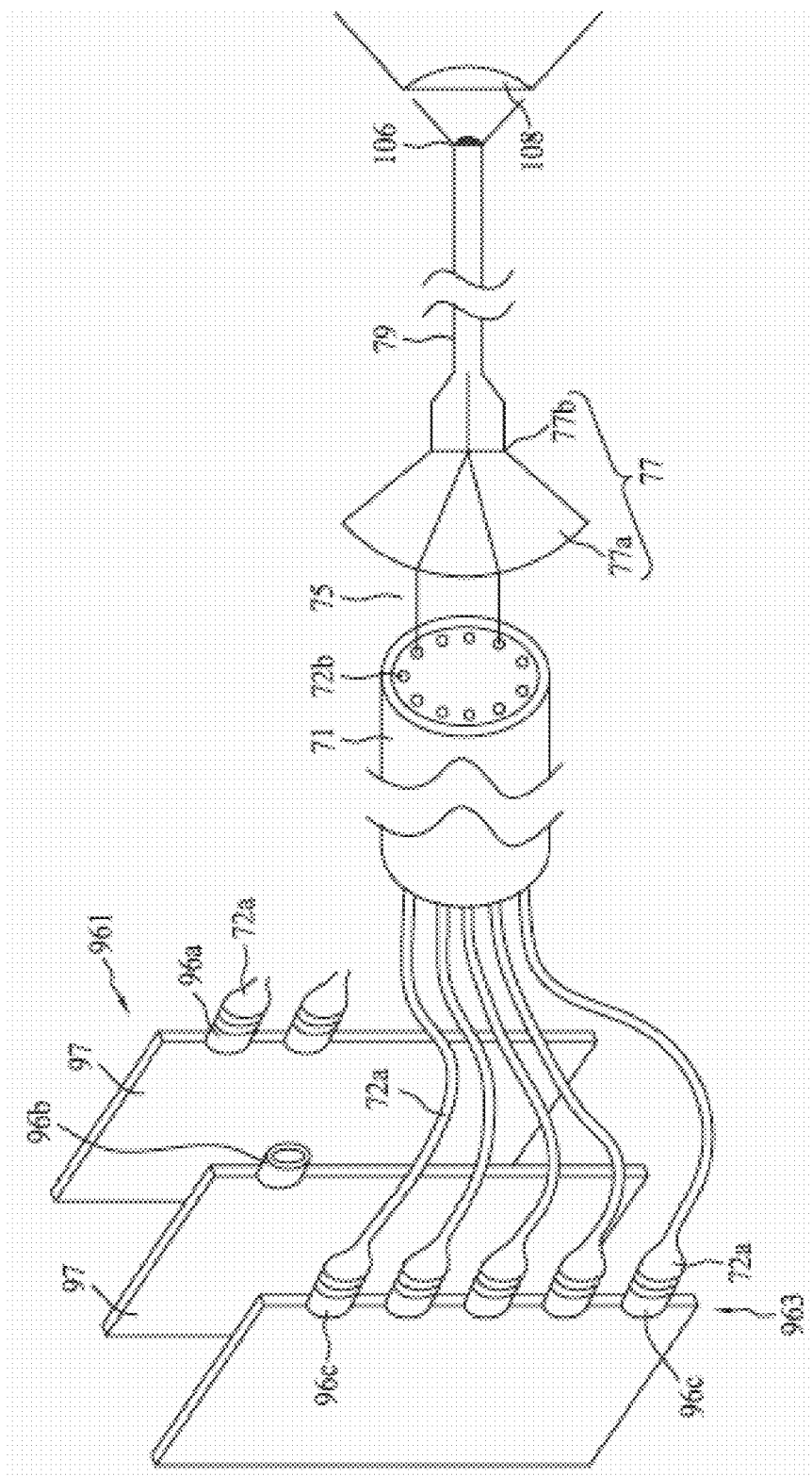
FIG. 9 illustrates a simplified top perspective view of an example light source configuration in accordance with some embodiments.

FIGS. 8 and 9 illustrate simplified front and top perspective views, respectively, of a light source configuration in accordance with some embodiments. In this case, light source output 65 includes an array of lasers that generate collimated light. Lasers may comprise any combination of diode lasers and/or diode pumped solid-state (DPSS) lasers, for example. The collimated light produced by a diode laser differs from radiant light and is characterized by light that is output with about the same output direction, and significantly in phase.

The array of lasers may comprise one or more red diode lasers 96a, one or more green diode lasers 96b, and one or more blue diode lasers 96c. A red laser set 961 comprises a plurality of red diode lasers 96a. A green laser set 962 comprises a plurality of green DPSS lasers 96b. A blue laser set 963 comprises a plurality of blue diode lasers 96c. The number and power of lasers for each color is scaled according to a desired light intensity output for display device 10 and according to the light sensitivity of a viewer to each color, as is to be appreciated. Each laser diode is installed on a circuit board 97, which mounts, and provides electrical control for, each laser diode installed thereon. Multiple lasers may be mounted on a single board 97 to reduce space occupied by light source 64. Including multiple lasers for a single color allows output luminosity of display device 10 to vary with the number of lasers turned on for each color, and allows for redundant control of light generation by lasers. Thus, one or more of the lasers may be turned off if less light intensity is desired, longevity of individual lasers benefits from periodic shut-down, or power conservation for display device 10 is preferred.

Figure 10:
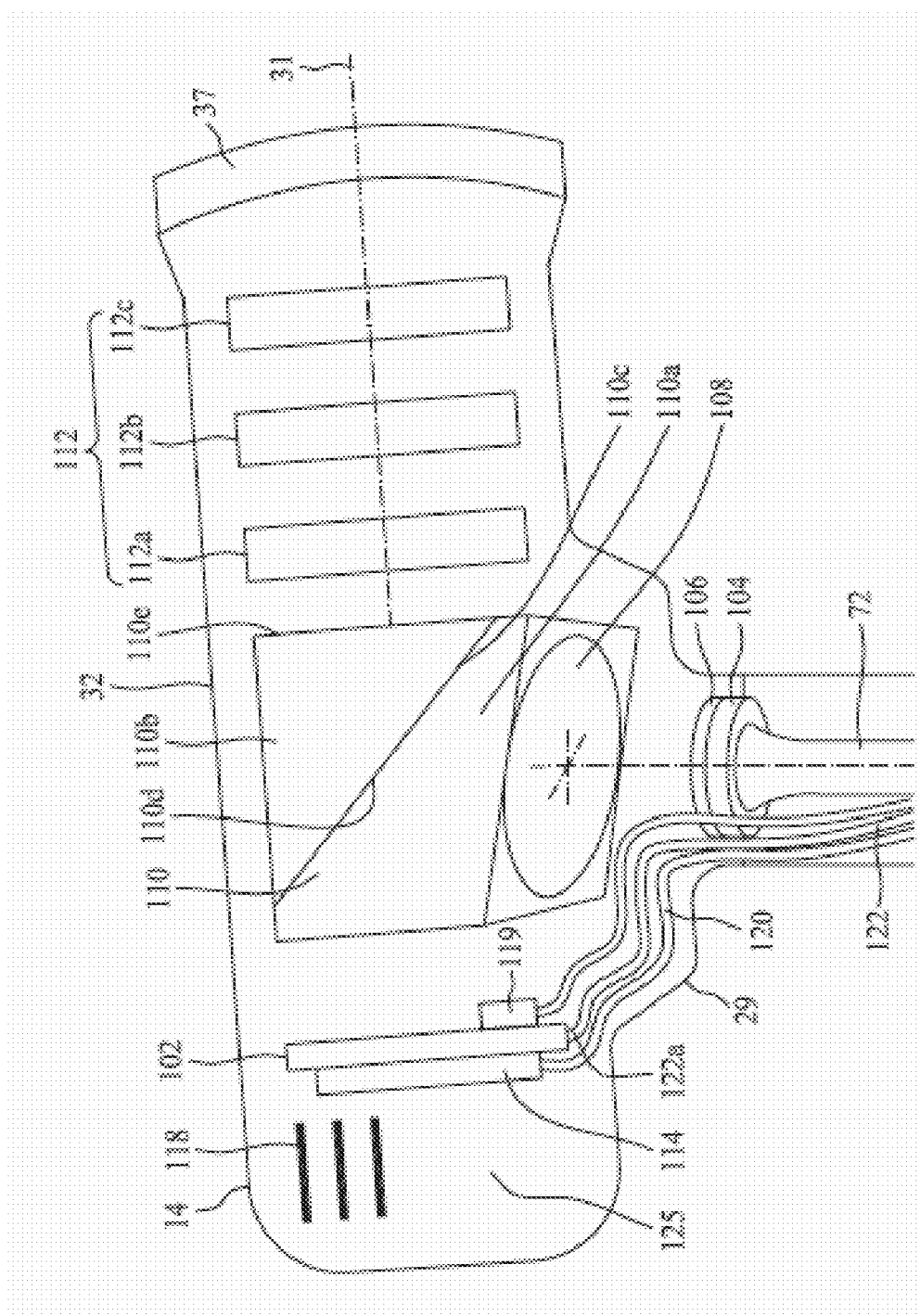
FIG. 10 shows a simplified side view of components within a projection output in accordance with aspects of the innovation.

Referring to FIG. 10, in embodiments, light output from the lasers is provided to fiber-optic cabling 72. Fiber-optic cabling 72 includes one or more fiber optic cables that transmit light from each laser along multiple or common optical paths to relay optics system 106 and 108 disposed along a light path between an exit end of fiber-optic cabling 72 and an optical modulation device 102.

Referring again to FIG. 9, each cable 72 has an inlet end 72a that receives light from a red laser 96a, a green laser 96b or a blue laser 96c; and each cable 72 also has an outlet end 72b that outlets the laser light for transmission to relay optics 106 and 108, and subsequent transmission to optical modulation device 102. Since fiber-optic cabling 72 may be bent and flexibly positioned, fiber-optic cabling 72 advantageously allows light transmission between lasers and relay optics system regardless of the positioning and orientation between the lasers and optics system. For example, this allows flexible arrangement of lasers, relay optics 106 and 108 and prism 110 (FIG. 10), which may be used to improve space conservation within base 12, decrease the footprint of base 12, and minimize display device 10 size. In addition, flexible fiber-optic cabling 72 also allows positional interface 16 to move without compromising light provision to the optical modulation device in projection output 14.

The number of fiber optic cables in cabling 72 will vary with design. Multiple fiber-optic cables may be employed in a design where each cable services one or more colors to the switch and one cable from the switch to each optical modulation device. As shown in FIG. 9, light from red diode laser 96a, green diode laser 96b or blue diode laser 96c is first transmitted into a fiber-optic cable dedicated to each laser; and subsequently routed by the switch into a common fiber-optic cable 71

In embodiments, each fiber-optic cable attaches directly to an individual laser. For example, each fiber-optic cable may include a fixture with an inner threaded interface that matches a threaded interface disposed on an outside surface of a diode laser housing. Commercially available fiber-optic cables, such as that available from Ocean Optics Inc. of Dunedin, Fla., may come standard with such coupling and alignment fixtures. In specific embodiments, a short focal length normal or GRIN lens is mounted at the inlet end of each cable to facilitate laser-to-fiber light transition and collimated transfer into cable.

Junction 75 permits transmission of light from fiber-optic cables 72 into converging optics 77, and into common fiber-optic cable 79. Converging optics 77 redirect incoming light from each fiber-optic cable into common fiber-optic cable 79 and comprise a converging lens 77a that redirects light toward re-collimating lens 77b, which collimates and re-directs incoming laser light from converging lens 77a into common optical fiber 79. Although not shown, junction 75 may also include a rigid structure, such as a suitably dimensioned molded plastic, that fixtures (e.g., holds and positions) fiber-optic cables and common fiber-optic cable 79. In specific embodiments, junction 75 comprises an optical adhesive that adheres cables directly to converging lens 77a. In other embodiments, at the outlet end 72b, the fiber-optic cables are combined into a larger cable that contains multiple fibers. Multiple fiber cables, such as fiber ribbon-based cables and those that employ multiple fibers located circumferentially within a round tube, are commercially available from a variety of vendors.

Multiple fiber-optic cable designs may be employed where each cable transmits a primary color. For example, three fiber-optic cables may be employed in which each cable transmits light from a primary color set of lasers along three different optical paths to three primary colors dedicated optical modulation devices.

Returning back to FIG. 7, inner light output 65 may also employ other light source arrangements to generate light for display device 10. Some light source arrangements, for example, may comprise an array of radiant light emitting diodes, e.g., characterized by radiant, non-lasing or non-collimated light generation. Similar to diode and DPSS lasers, radiant light emitting diodes consume less power and generate less heat than a white light lamp, and also emit colored light and thereby may operate without a color wheel. Light output 65 may also include one or more dichroic mirrors in white light generation assemblies to separate red, green and blue light for transmission within fiber optic cables 72 to color dedicated optical modulation devices, such as three liquid crystal display (LCD) valves employed for red, green and blue control.

With continued reference to FIG. 7, power supply 66 is configured to electrically power to light source 64 and other components within display device 10 that rely on electrical power. Thus, power supply 66 provides electrical energy to control circuitry 76, input/output circuitry 74, fans 62a and 62b, power diode 80 and components within projection output 14 such as optical modulation device 102 (FIG. 10). Power diode 80 is in electrical communication with an external power switch 82 and illuminates when display device 10 is turned on to indicate whether display device 10 is on or off. A power cord port 81 receives a power cord, which couples power supply 66 to an AC power source such as a wall power supply. In embodiments, conversion of AC power to DC power occurs in a transformer included between ends of the power cord, as is common with many laptop computer power cords, thereby reducing the size of power supply 66, base 12 and display device 10 and increasing portability of display device 10. Circuitry within power supply 66 may then convert incoming power to one or more DC voltages for specific components in display device 10.

In other embodiments, power supply 66 comprises at least one rechargeable battery 66a. Battery 66a may be recharged using power provided through inlet port 81. Battery 66a allows display device 10 to operate on stored energy and without reliance on proximity to an AC power source, which further increases portability of display device 10. For example, inclusion of a battery in base 12 extends usage into a car, library, coffee shop, remote environment, or any other setting where AC and fixed power outlets are not readily available or within reach.

At least one fiber-optic cable 72 transmits light from light source 64 to relay optics (FIG. 10) disposed along a light path between an exit end of fiber-optic cable 72 and optical modulation device 102 in projection output 14. With respect to device 10 structure, fiber-optic cable 72 transmits light from one compartment to a separate compartment, namely, from light source output in base 12 to projection output 14. The number of fiber optic cables will vary with design. As mentioned above, multiple fiber-optic cables may be employed in a laser light generation design, for example, where each fiber-optic cable 72 services one or more diode lasers. Alternatively, each fiber-optic cable 72 may service a primary color. For example, one fiber-optic cable may be used to transmit sequentially controlled red, green and blue generated by a diode laser array and transmitted along a single light path to a single mirror-based optical modulation device. Three fiber-optic cables may be employed to transmit light from a laser array that outputs red, green and blue light into three fiber-optic cables, to three optical modulation devices that are each dedicated to modulation of a primary color.

Fiber-optic interface 70 facilitates transmission of light from each laser into fiber-optic cabling 72. Fiber-optic interface 70 may include one or more fixtures that position and hold an inlet end for each fiber-optic cable included in fiber-optic cabling 72 such that light output from the light source transmits into a fiber-optic cable. Fiber-optic interface 70 may also include optics that direct light from lasers into fiber-optic cabling 72. In embodiments, a single fiber-optic cable is used in cabling 72 and fiber-optic interface 70 includes a lens system disposed between the outlet of a lamp or each laser and the inlet of the single fiber-optic cable to direct light into the cable.

The lens system may comprise at least two lenses: a first lens to direct the light towards the fiber entrance and a second lens that collimates light entering the cable. In other embodiments that implements a one-to-one laser to fiber-optic cable relationship; fiber-optic interface 70 holds the inlet end for each fiber-optic cable relatively close to the outlet of each laser to receive light therefrom. Each cable in this case may include a converging lens at its inlet end that facilitates light capture and transmission into a cable. In another one-to-one design, each fiber-optic cable in fiber-optic cabling 72 includes a fixture that permits attachment to another object. For example, conventionally available fiber-optic cables available from vendors such as Ocean Optics Inc. of Dunedin, Fla. include a detachable fixture with a thread that allows screwing and fixing of the fiber-optic cable to a mating thread disposed on a laser housing. In this case, fiber-optic interface 70 comprises the threaded fixture from each cable and the mating thread on the laser.

In some cases, a projection device with multiple outputs may be operated in single output mode. In single path embodiments where red, green and blue lasers transmit colored light to a single optical modulation device along a single fiber-optic cable, switch 105 and fiber-optic interface 70 receives colored light from each colored laser, in turn, according to timed control signals provided to the lasers by control circuitry 76.

Input/output circuitry 74 provides an interface between control circuitry 76 and one or more input/output interfaces 78 (FIG. 7). Input/output interfaces 78 are configured to receive at least one cable, wire, or connector, such as a cable for transmitting video signal and audio signal comprising video/audio data from a content processing device, such as DVD player, gaming device, desktop or laptop computer or other devices being capable of providing multimedia signals. Common ports suitable for use with input/output interfaces 78 include ports that receive S video cable, 6-pin mini DIN, VGA 15-pin HDDSUB female, an audio cable, component RCA through an S-Video adaptor, composite video RCA cabling, a universal serial bus (USB) cable, fire wire, etc. Input/output interfaces 78 may also include an audio output port for wired connection to speakers employed by a headphone or speakers.

Control circuitry 76 provides control signals to components of multimedia output system 4 including display device 10 and speakers 6. In embodiments, control circuitry 76 provides control signal to components not within base 12 by routing data from input/output circuitry 74.

Control circuitry 76 (or controller component 105 of FIG. 1) provides control signals to light source 64 that determine when light source 64 is turned on/off. In addition, circuitry 76 may include memory that stores instructions for the operation of components within display device 10. For example, circuitry 74 may provide control signals to control fans 24 according to stored heat regulation instructions. One or more sensors may also be disposed within base 12 to facilitate thermal regulation. For example, a temperature sensor may be disposed proximate to circuitry 74 and 76 to monitor temperature levels and participate in closed loop temperature control within base 12 as controlled by control circuitry 76.

Input/output circuitry 74 and input ports 78 collectively permit communication between display device 10 and a device that outputs a video signal carrying video data. For example, desktop computers, laptop computers, personal digital assistants (PDAs), cellular telephones, video game consoles, digital cameras, digital video recorders, DVD players, and VCRs, may all be suitable to output video data to display device 10. Video signal provided to control circuitry 76 may be in an analog or digital form. In some cases, input/output circuitry 74 and control circuitry 76 convert analog video signals into digital video signals suitable for digital control of an optical modulation device included in display device 10, such as a liquid crystal display "LCD" device or a digital micro-mirror "DMD" device. Thus, input/output circuitry 74 or control circuitry 76 may also include support software and logic for particular connector types, such as processing logic required for S-video cabling or a digital video signal. Control circuitry 76 may also include and access memory that facilitates conversion of incoming data types and enhances video compatibility of display device 10. Suitable video formats having stored conversion instructions within memory accessed by control circuitry 76 may include NTSC, PAL, SECAM, EDTV, and HDTV (1080i and 720p RGBHV), for example.

When lasers are used for light generation within light source 64, control circuitry 76 receives video data included in a signal via one or more input/output interfaces 78 and input/output circuitry 74, converts the data to color frame sequential data, and synchronizes the frame sequential data for delivery to each optical modulation device 102 (FIG. 10) and to each laser 96. In a single, double or triple path design between lasers 96 and the optical modulation device where one optical fiber transmits red, green and blue light in a time controlled sequential order to each optical modulation device, this includes synchronizing the timing of data sent to the optical modulation device and on-off commands sent to lasers 96.

Figure 11:
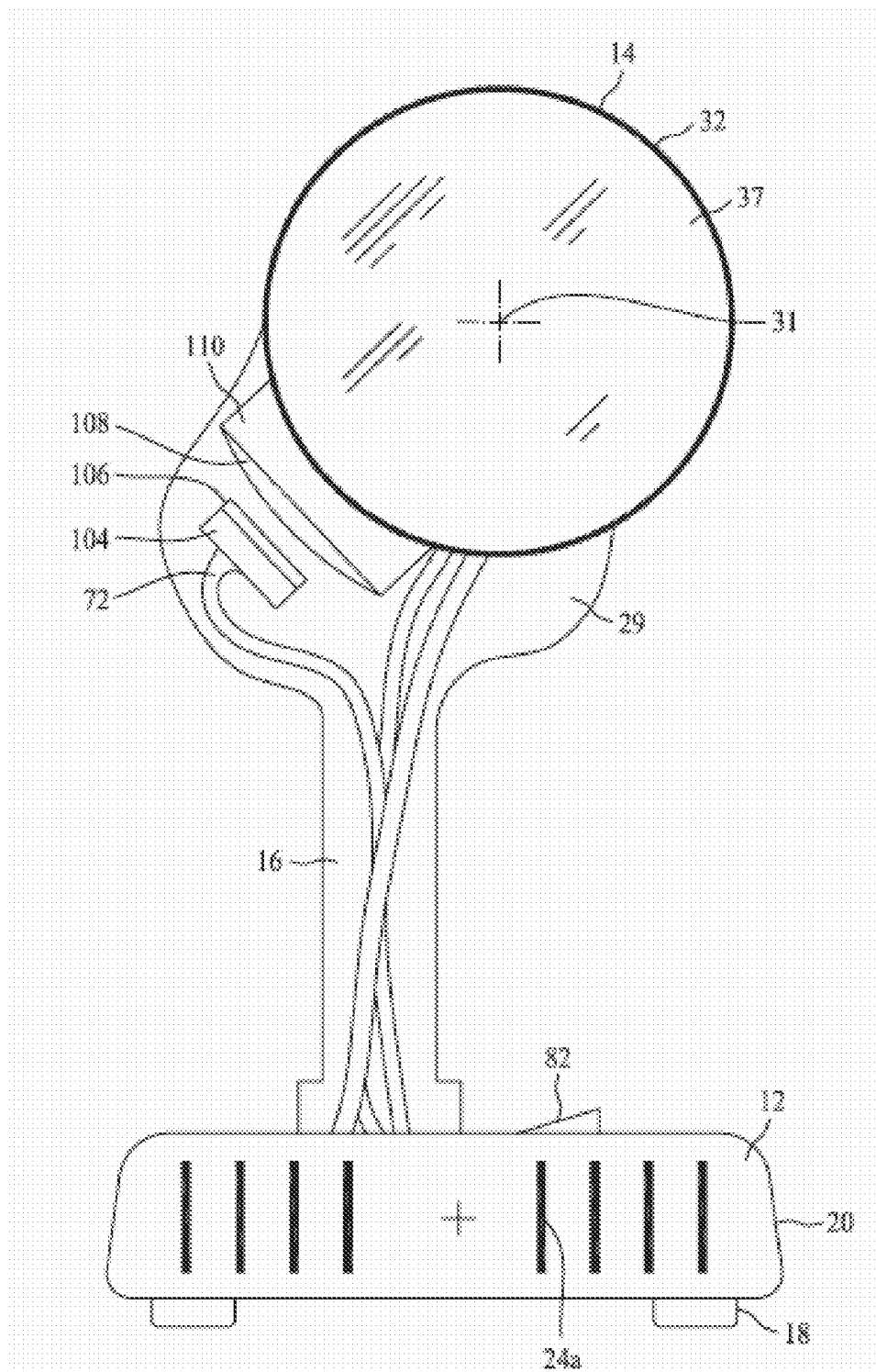
FIG. 11 illustrates a front view of display device with positional interface and lower projection output cutaway in accordance with aspects.

FIG. 10 shows a simplified side view illustration of components within projection output 14 of FIG. 5, taken through a vertical midpoint of output 14 along its cylindrical axis, in accordance with some present embodiments. FIG. 11 shows a front view illustration of display device 10 with positional interface 16 and lower projection output 29 cutaway to show components therein. Projection output 14 comprises optical modulation device 102, fiber-optic interface 104, relay optics 106 and 108, prism structure 110, projection lens system 112, control and power cabling 120, and air duct 122.

Fiber-optic cabling 72 attaches to a fiber-optic interface 104 and outputs light to relay optics 106. In embodiments, fiber-optic interface 104 secures fiber-optic cabling 72 such that slack is provided for fiber-optic cabling 72 between attachment at fiber-optic interface 104 and attachment within base 12. The slack allows fiber-optic cabling 72 to deflect with positional interface 16 for various positions of projection output 14 relative to base 12.

Together, fiber-optic cabling 72 and fiber-optic interface 104 direct light generated by light source 64 to prism 110. In embodiments, fiber-optic cabling 72 and interface 104 are configured with respect to prism 110 so as to provide an optical path of incident light that is about perpendicular to an incident surface of prism 110. Some digital micro-mirror light modulator designs require that incoming light be incident on the light modulator from either above or below its light reflecting surface to allow light output along projection path 31. Receiving interface 29 of projection output housing 32 and fiber-optic interface 104 ease this requirement and allow a designer to arrange fiber-optic cabling 72 and fiber-optic interface 104 within receiving interface 29 such that fiber-optic interface 104 directs light at a particular desired angle relative to prism 110, and onto optical modulation device 102. For example, fiber-optic interface 104 may be coupled to receiving interface 29 to provide an incident light path that is perpendicular onto an incident surface of prism 110 and has a 45 degree angle relative to optical modulation device 102 (e.g., prism 110 is rotated 45 degrees about projection path 31). Attachment between interface 104 and housing 29 maintains the desired incoming light angle despite changing positions of fiber-optic cabling 72 along its length caused by repositioning of positional interface 16.

Relay optics 106 and 108 convert light received from fiber-optic cabling 72 to light suitable for transmission into prism structure 110 and onto optical modulation device 102. This may include shaping and resizing light flux received from fiber-optic cabling 72 using one or more lenses.

In other embodiments, display device 10 comprises a pair of fly-eye lenses arranged in the optical path between light source 64 and prism 110. Cumulatively, the pair of fly-eye lenses uniformly distributes light received from fiber-optic cabling 72 to the flux transmitted upon optical modulation device 102. In specific embodiments, the pair of fly-eye lenses are arranged on either and a fiber-optic cabling 72. The first fly-eye lens is disposed at fiber-optic interface 70 within base 12, receives light from a lamp or diode laser array, and spatially divides the entire input light flux into a set of blocks or components that each comprises a portion of the total area of the inlet flux. Light for each block or component then travels down its own fiber-optic cabling 72. The second fly-eye lens comprises the same number of blocks or components and is disposed at relay lens 106. The second fly-eye lens receives a fiber-optic cable for each block or component, and outputs light for each component such that the light from each component is expanded to span the downstream dimensions of optical modulation device 102 and the projected image.

Prism structure 110 is an optical modulation system that provides light to optical modulation device 102 at predetermined angles. Prism structure 110 also transmits light from optical modulation device 102 to the projection lens system 112 along projection path 31. Prism structure 110 comprises prism components 110*a* and 110*b* that are separated by air space or bonding interface 110*c*. Interface 110*c* is disposed at such an angle so as to reflect light provided from fiber-optic cables 72 (and intermittent relay optics) toward optical modulation device 102. In addition, interface 110*c* allows light reflected by optical modulation device 102 to transmit to projection lens system 112 along projection path 31.

Optical modulation device 102 is configured to selectively transmit light to provide an output image along projection path 31. To do so, optical modulation device 102 is supplied with video data included in a video signal and selectively transmits light according to the video data. The video data is typically provided to device 102 on a frame by frame basis according to individual pixel values. If the video data is not received by display device 10 in this format, control circuitry 76 in base 12 may convert the video data to a suitable format for operation of optical modulation device 102. In embodiments, individual light modulation elements within optical modulation device 102, which each correspond to an individual pixel on the output image, translate received digitized pixel values into corresponding light output values for each pixel.

In specific embodiments, optical modulation device 102 is a mirror based optical modulation device, such as a digital micro mirror device (or DMD, a trademark of Texas instruments Inc.) commercially available from Texas Instruments, Inc. In this case, optical modulation device 102 comprises a rectangular array of tiny aluminum micromechanical mirrors, each of which individually deflects about a hinged axis to selectively reflect output image light down projection path 31, and reflect non-image light away from projection path 31. The deflection state or angle of each mirror is individually controlled by changing memory contents of an underlying addressing circuit and mirror reset signal. The array of mirrors is arranged such that each mirror is responsible for light output of a single pixel in the video image. Control signals corresponding to pixel output are supplied to control electrodes disposed in the vicinity of each mirror, thereby selectively deflecting individual mirrors by electromagnetic force according to video data on a pixel by pixel basis. Light reflected by each mirror is then transmitted along projection path 31, through prism structure 110, and out of projection output 14 using projection lens system 112.

A controller 114 is included with optical modulation device 102 and provides control electrical signals that direct each micromechanical mirror to desired light reflecting states corresponding to pixel video data for each pixel. Control and power cabling 120 provides electrical communication between controller 114 and control circuitry 76 in base 12 (FIG. 7). Thus, at least one electrical connector included in cabling 120 couples to controller 114 in projection output 14 and to control circuitry 76 in base 12 and provides electrical communication therebetween. A power line within cabling 120 extends between optical modulation device 102 in projection output 14 and power supply 66 in base 12 and provides power from power supply 66 to device 102. Control and power cabling 120 then travels through positional interface 16 which includes one or more holes or apertures that allow control and power cabling 120 to pass therethrough without impingement on control and power cabling 120 for any position of projection output 14. In embodiments, control and power cabling 120 passes through a plastic tube in positional interface 16 to further protect the wires.

The illumination angles for optical modulation device 102 are set by the output direction of fiber-optic interface 102, arrangement of relay optics 106 and 108, and the faces of prism structure 110. After light reflection by individual mirrors of optical modulation device 102, reflected light exits prism structure 110 towards lenses 112 along projection path 31.

Vents 118 are disposed on an aft portion of projection output housing proximate to optical modulation device 102. An air duct 122 includes a high-pressure end proximate to optical modulation device 102 and controller 114, and a low pressure end disposed within base 12. As mentioned above with respect to FIG. 7, fans 62a and 62b draw air from within base 12 and exhaust the air out exhaust vents 24b, which creates a negative pressure within base 12 relative to the ambient room or surroundings. Correspondingly, fans 62a and 62b create a negative pressure for the end of air duct 122 within base 12 relative to the opposite end in projection output 14, which would otherwise rest at room pressure due to vents 118. By disposing one end of air duct 122 within base 12 and the other end in a space 125 around optical modulation device 102, fans 62 thus draw air from the space 125 and cool optical modulation device 102. Cumulatively, cooling air is drawn from the ambient surroundings around projection output 14, through vents 118 and into a space 125 surrounding optical modulation device 102, into duct 122 at end 122a, through duct 122, out duct 122 at end 122b, into base 12, and out air vents 24b. Fans 62 maintain end 122b at a low pressure relative to end 122a, and thus provide continual cooling for optical modulation device 102.

A projection lens system 112 is disposed along projection path 31 for outputting light transmitted by the optical modulation device along projection path 31. Projection lens system 112 manipulates image light transmitted by optical modulation device 102 along projection path 31 such that a projected image cast on a receiving surface enlarges as distance from output optical projection lens 37 to the receiving surface increases. Projection lens system 112 comprises lenses 112a, 112b, 112c and output optical projection lens 37, each of which are disposed centrically along and orthogonal to projection path 31. Distances between each lens may vary with a desired splay angle from output optical projection lens 37, as may the number of lenses used.

In embodiments, display device 10 is designed for a short throw distance, such as between about six inches and about fifteen feet. Display device 10 may also include one or more buttons or tools that allow a user to manually focus and manually zoom output from projection lens system 112. Projection output 14 may also include a lens between optical modulation device 102 and prism 110 that converges image light reflected by device 102 towards projection path 31. This allows a reduction in output lens 112 diameters, and a corresponding reduction in diameter and size for projection output 14.

In some other embodiments, other types of light modulators and light path designs may be employed. For example, fiber-optic cabling 72 may be arranged for a multiple light path design to transmit light to three primary color dedicated LCD optical modulators, or to three primary color dedicated DMD optical modulators. In the case of an LCD optical modulation device, selective transmission of light comprises selective passage of light through a liquid crystal medium on a pixel by pixel basis.

In addition, although base 12 of FIG. 5 has been primarily described with respect to components dedicated to projection functionality, it is understood that base 12 may be inclusive in a larger system, or comprise components not directed solely to display device 10 output. For example, base 12 may be part of a computer housing that includes components for projection functionality and components for computer functionality in a computer system, such as a desktop computer or video game console. Computer functionality components may include a processor, a hard drive, one more interface and control boards, a disk or floppy drive, etc. In this case, housing 20 is considerably larger to accommodate the combined functionality and components. In addition, some components may be shared, such as a power supply and fans used for movement of air within the housing.

Figure 12:
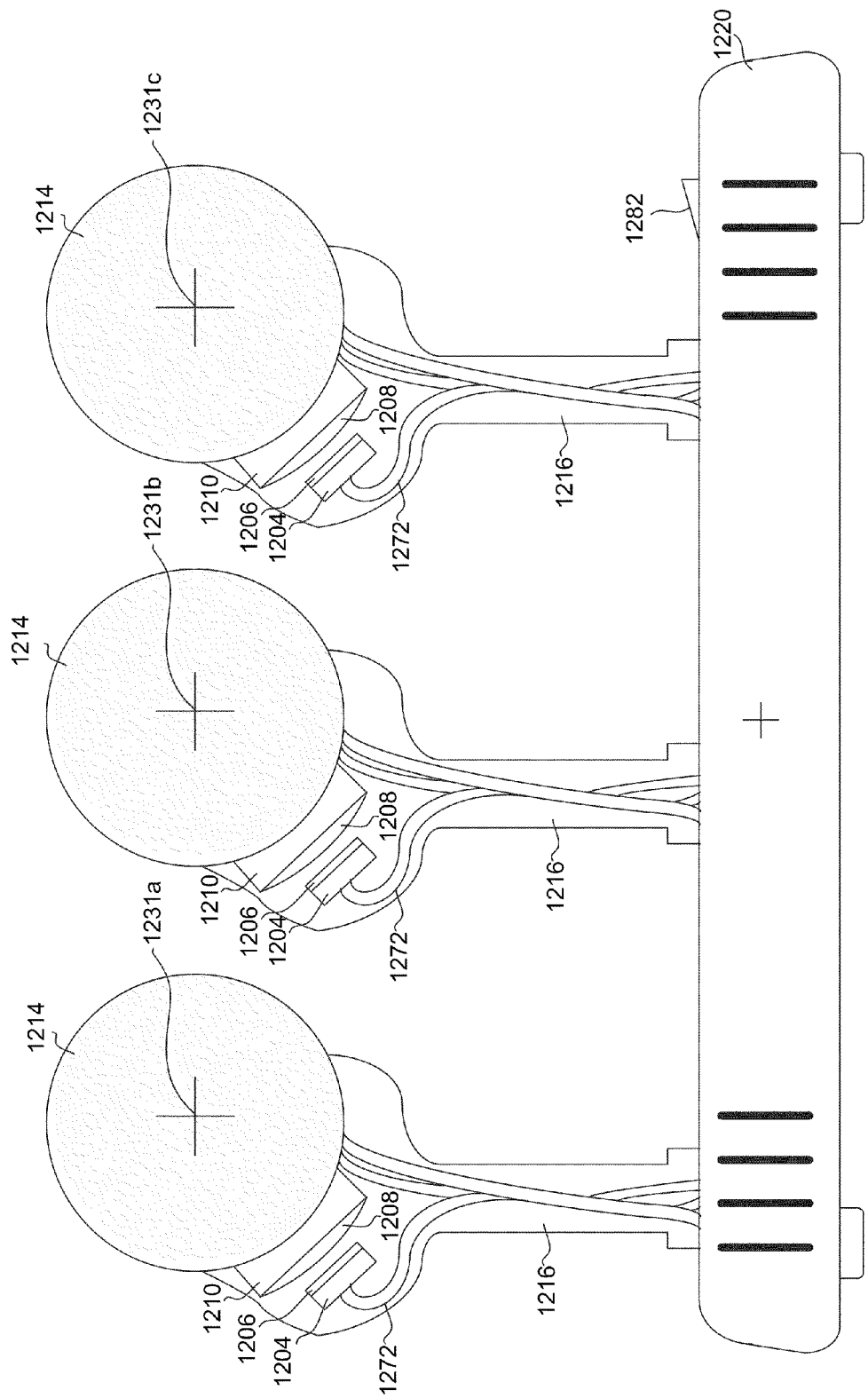
FIG. 12 illustrates a front view of an alternate embodiment of a projection display device with multiple positional interfaces.

FIG. 12 shows a front view illustration of display device 1220 with three positional interfaces 1216 for multiple light outputs from projection outputs 1214 in accordance with a non-limiting embodiment. The positional interfaces 1216 comprise fiber-optic interfaces 1204, relay optics 1206 and 1208, prism structures 1210. Fiber-optic cablings 1272 attaches to fiber-optic interfaces 1204 and output light to relay optics 1206. Together, fiber-optic cablings 1272 and fiber-optic interfaces 1204 direct light generated by the respective light sources to prisms 1210. In embodiments, fiber-optic cablings 1272 and interfaces 1204 are configured with respect to prism 1210 so as to provide an optical path of incident light that is about perpendicular to an incident surface of prism 1210.

Fiber-optic interfaces 1204 allow a designer to arrange fiber-optic cablings 1272 and fiber-optic interfaces 1204 such that the fiber-optic interfaces 1204 direct light at a particular desired angle relative to prism 1210. Relay optics 1206 and 1208 convert light receive from fiber-optic cablings 1272 to light suitable for transmission into prism structures 1210. This may include shaping and resizing light flux received from fiber-optic cablings 1272 using one or more lenses. In other embodiments, display device 1220 comprises a pair of fly-eye lenses arranged in the optical path between the light sources and prisms 1210.

Prism structures 1210 are optical modulation systems that provide light to optical modulation devices at predetermined angles. The illumination angles for the optical modulation devices are set by the output directions of the fiber-optic interfaces, arrangement of relay optics 1206 and 1208, and the faces of prism structures 1210. After light reflection by individual mirrors of the optical modulation devices, reflected light exits prism structures 1210 along projection paths 1231a, 1231b and 1231c, respectively, from the different positional interfaces 1216. In some other embodiments, other types of light modulators and light path designs may be employed. In the present embodiment, fiber-optic cablings 1272 are arranged for a multiple light path design to transmit light from each of the outputs 1214.

Figure 13:
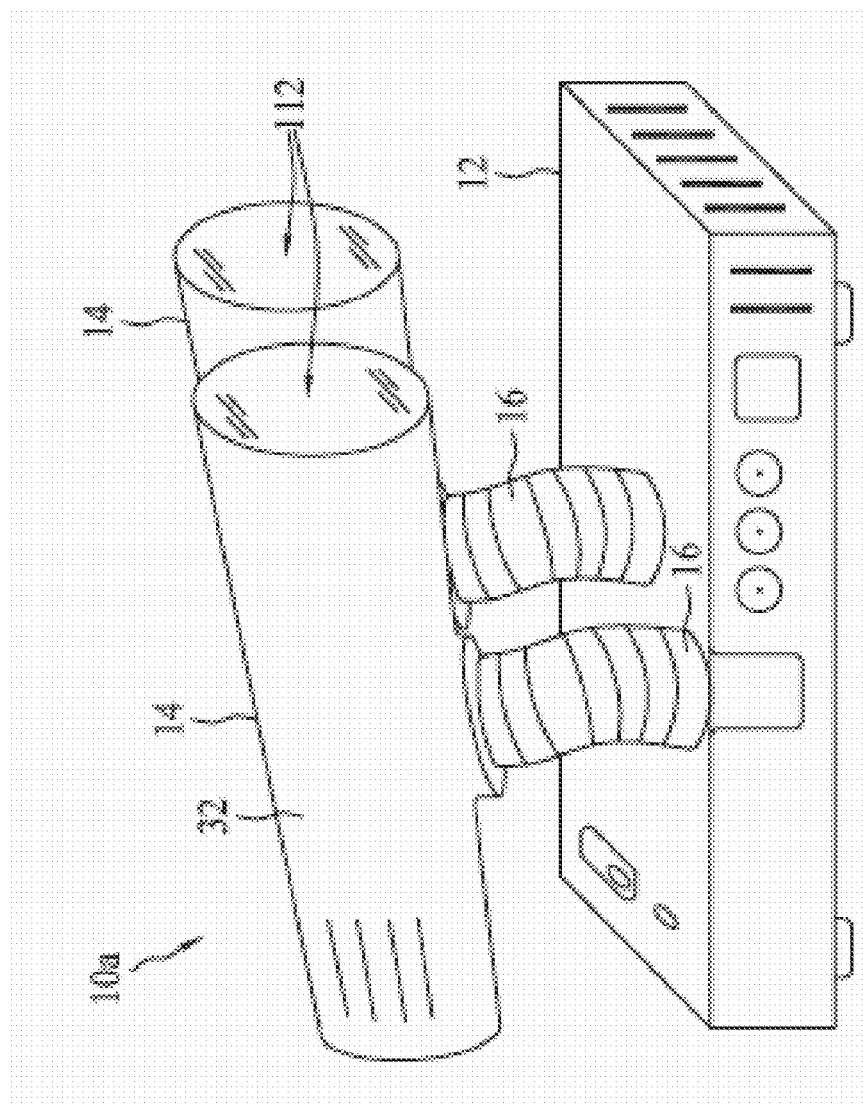
FIG. 13 illustrates an alternative perspective view of a display device in accordance with one of the present embodiments.
Figure 14:
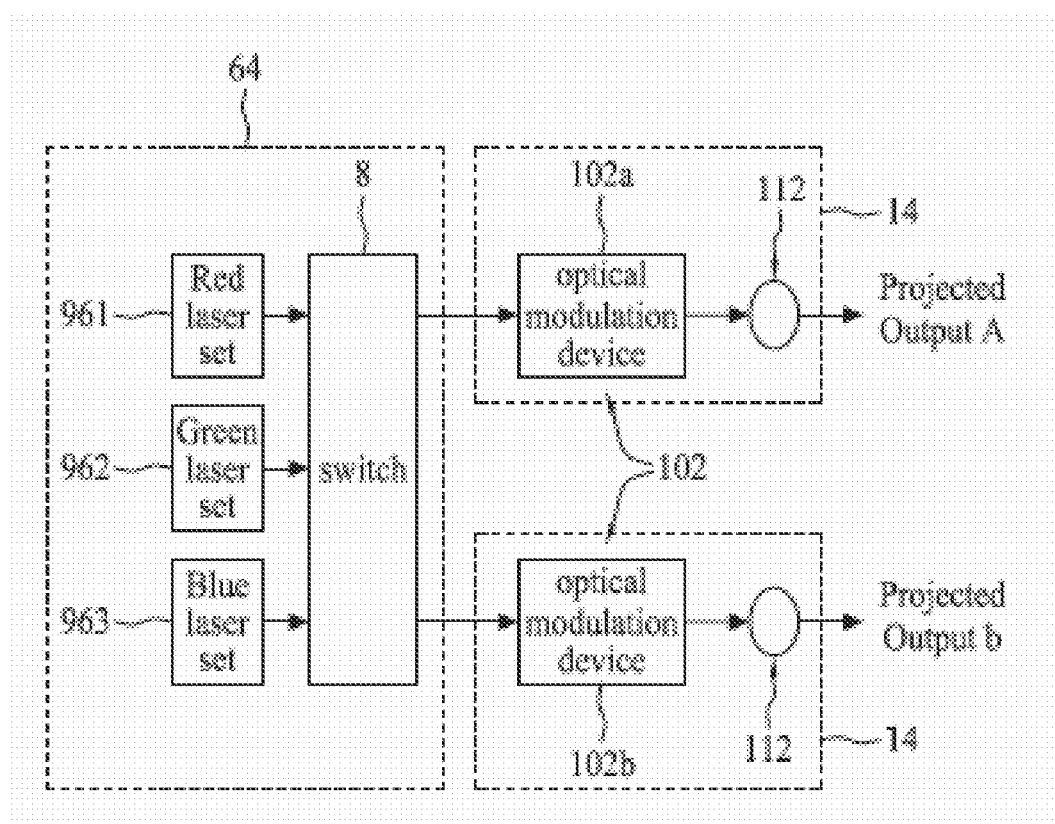
FIG. 14 illustrates an alternative schematic chart showing a switch diverting light beams from light source into different projection outputs in accordance with one of the embodiments.

Turning now to FIGS. 13 and 14, FIG. 13 illustrates a perspective view of a display device 10a in accordance with one of the present embodiments. As shown, display device 10a comprises a base 12, two projection outputs 14, and two positional interfaces 16

FIG. 14 shows a schematic chart illustrating optical path from a light source 64 configured in base 12 (FIG. 13) to each projection output 14. Light source 64 includes a plurality of laser sets, such as a red laser set 961, a green laser set 962 and a blue laser set 963, generating a plurality of laser beams with different color to one another, such as red laser beam, green laser beam and blue laser beam. As shown in FIG. 14, light source 64 also includes a switch 8 which receives the red laser beam, green laser beam and blue laser beam from the red laser set 961, the green laser set 962 and the blue laser set 963 respectively.

In the embodiments according to FIGS. 13 and 14, display device 10a comprises two projection outputs 14. Each of the projection outputs 14 includes an optical modulation device 102 and a projection lens system 112. The optical modulation device 102 is configured to selectively transmit light generated by the light source according to a receiving video data. The projection lens system 112 is configured to output light transmitted by the optical modulation device 102 along a predetermined projection path, so as to display projection images on one or more external receiving surfaces.

As described supra, the switch 8 is capable of diverting the red laser beam, the green laser beam and the blue laser beam in a predetermined sequential order to each of the two optical modulation devices 102. For instance, in embodiments, there are three modes corresponding to a first time frame, a second time frame and a third time frame, respectively.

The first mode—during the first time frame, red laser beam is transmitted from switch 8 to optical modulation device 102a; green laser beam is transmitted from switch 8 to optical modulation device 102b; and blue laser set 963 is turned off or stays in a low voltage stage which no laser light is generated.

The second mode—during the second time frame, green laser beam is transmitted from switch 8 to optical modulation device 102a; blue laser beam is transmitted from switch 8 to optical modulation device 102b; and red laser set 961 is turned off or stays in a low voltage stage which no laser light is generated.

The third mode—during a third time frame, red laser beam is transmitted from switch 8 to optical modulation device 102b; blue laser beam is transmitted from switch 8 to optical modulation device 102a; and green laser set 962 is turned off or stays in a low voltage stage which no laser light is generated.

Lasting time of the first time frame, the second time frame and the third time frame may be identical to one another in embodiments. Namely, the first mode, the second mode and the third mode take turns evenly to be applied in the light source 64. In some other embodiments, lasting time of the first time frame, the second time frame and the third time frame may differ from one another according to system requirement. Such adjustment toward lasting time may be used as color control manner of the display device 10a.

Referring now to FIGS. 15, 16, 17 and 18, FIG. 15 which shows display device 10a projects projection images on a receiving surface 521. Display device 10a according to FIG. 15 comprises two projection outputs with moveable projection chambers and output optics which controllably position images in a first projection area 501 and a second projection area 502 respectively. In embodiments, projection area 501 and projection area 502 are set adjacent to each other horizontally but not connect with.

One skilled in the art may notice that keystone correction may be applied in the condition of the projection path 531 (shown in FIG. 15) of a projection output 14 being not perpendicular to receiving surface 521, so as to display images corresponding to orthogonal image coordinates.

The orthogonal image coordinates refer to a stored data format, positional arrangement for pixels, or an assumed output format for display of the video information. In some embodiments, pixel values are assigned or stored according to a positional arrangement of pixels in a planar image, such as a right angle x-y coordinate system. The x-y coordinate pixel locations are then used to determine where video data is output on an image. Characterizing video information according to orthogonal image coordinates denotes how they are stored and/or intended for display, and not necessarily how they are actually cast or displayed. Thus, for several present embodiments, the projection image may not always be truly orthogonal if keystone correction has not been applied. Namely, when the projection path 31 (shown in FIG. 10) of a projection output 14 is not perpendicular to receiving surface 521, keystone distortion of the image may appear. Keystone distortion often produces a trapezoidal image for rectangular video information intended for display according to orthogonal image coordinates. In some embodiments, the display device includes keystone correction tool for reducing keystone distortion.

Figure 15:
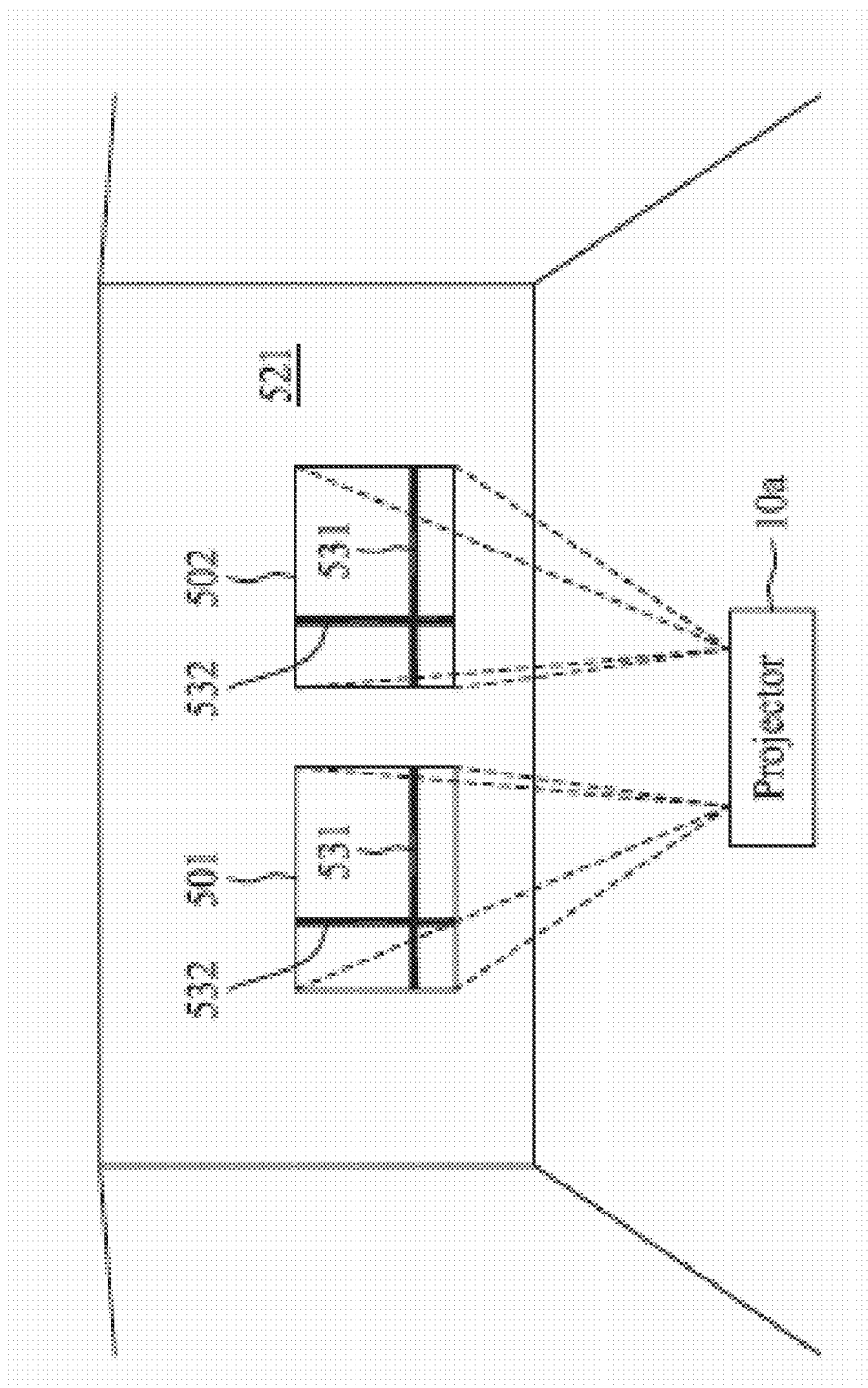
FIGS. 15-18 show various aspects of a display device casting projection images on a receiving surface in accordance with some of the present embodiments.

In embodiments, display device 10a also includes one or more image detectors 119 (as shown in FIG. 10), such as camera module, configured to detect image of external environment, such as receiving surface 521, and to detect projection images, such as video images projected in first projection area 501 and second projection area 502 as shown in FIG. 15. In embodiments, two image detectors 119 are disposed within each of the two projection output 14 of display devices 10a respectively, so as to utilize optical function of the projection lens system 112. In some other embodiments, image detector 119 is disposed outside projection output 14; and each of projection outputs 14 comprises an image detector coupled to projection output housing externally. In other embodiments, display device 10a may comprise one or more image detector coupled to base 12, optionally with a positional interface to shift viewing angle of image device 119 so as to detect image at various positions.

In embodiments, image detector(s) 119 may provide information of projection image to display device 10a for automatic keystone correction. Display device 10a may firstly project test images in the first projection area 501 and the second projection area 502. The test images may be quickly flashed in some cases so a user may or may not be aware of their presence. Each of the image detectors 119 is capable of detecting the projection test image in real-time and providing the receiving information to control circuitry 76 (shown in FIG. 7) so as to fix the keystone distortion in closed loops. In embodiments, the detected outlines of the projection images 501 and 502 are compared to predetermined orthogonal image coordinates so as to perform automatic keystone correction function. In other embodiments, the default test image may include a horizontal reference line 531 and a vertical reference line 532. The horizontal reference line 531 and the vertical reference line 532 may include graduation label therein. The automatic keystone correction may be performed by detecting distortion of the horizontal reference line 531 and the vertical reference line 532 of the projection image.

In embodiments, the display device 10*a* may include an image coordination tool to automatically coordinate multiple projection areas, such as first projection area 501 and second projection area 502. As shown in FIG. 15, display device 10*a* may be used as video output of a computer device with a dual-screen GUI (graphic-based user interface). For instance, first projection area 501 is used for displaying host or original desktop; and second projection area 502 is used for displaying extension desktop.

A user may wish to have the first projection area 501 and second projection area 502 with the same size and the same altitude. In this application, the horizontal lines 531 detected by image detector 119 may be used by the image coordination tool for measuring the size and relative location of each projection area. By aligning the horizontal lines is capable of arrange first projection area 501 and second projection area 502 at a same altitude.

In another embodiment, images 501 and 502 are connected horizontally. In this case, the image coordination may be used to remove any projection overlap between the images 502 and 504 on the receiving surface—after keystone correction. The removed portion of display may be taken from either projected image 502 or 504. A graphics processor associated with the images may then provide a continuous digital workspace between projection images 501 and 502, e.g., a mouse or pointer moves smoothly between the projection images 501 and 502 at their intersection.

Figure 16:
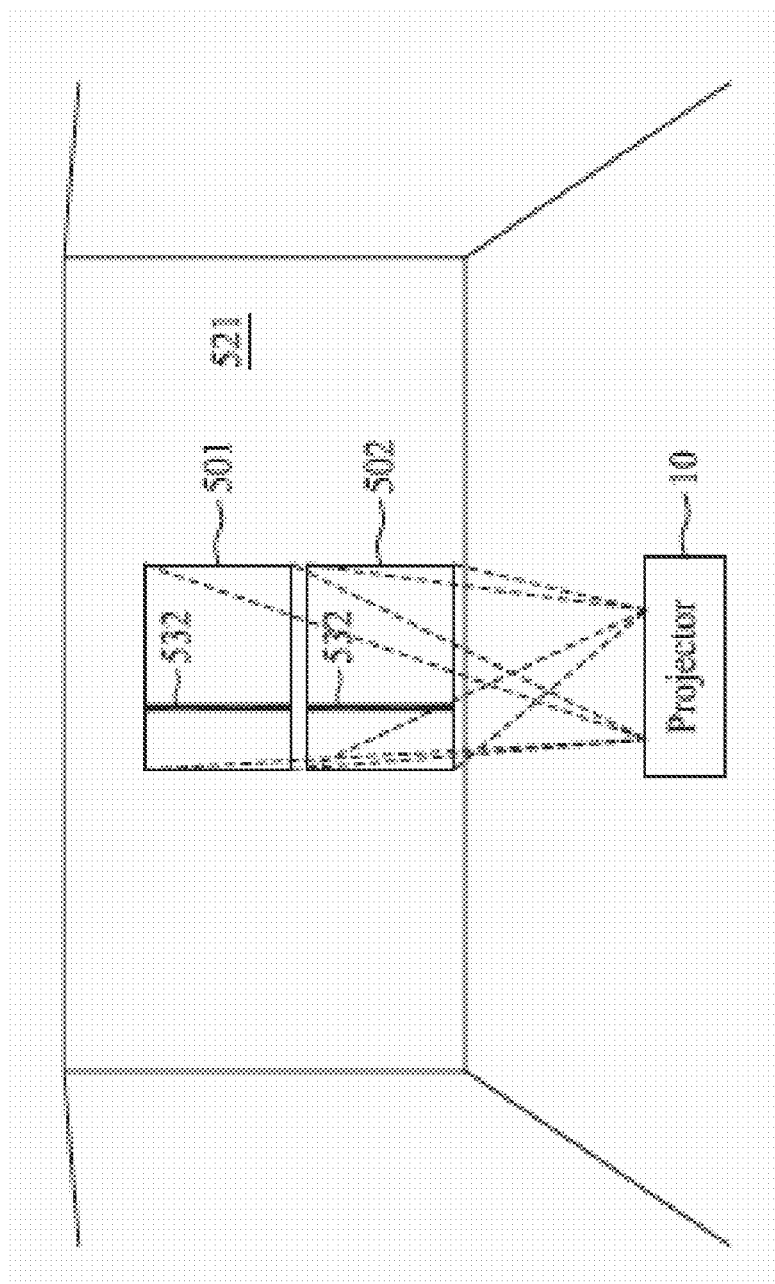

FIG. 16 shows that display device 10 may vertically project two projection images on a receiving surface 521 in accordance with one of the present embodiments. Here, display device 10 may comprise two or three (or more) projection outputs 14. Two video signal sources are coupled to display device 10 so only two projection outputs 14 are used in this instance. Projection images are displayed in first projection area 501 and second projection area 502 respectively after keystone correction. In embodiments, projection area 501 and projection area 502 are set vertically adjacent to each other but not connected. Alternatively, the projection areas 501 and 502 may overlap or rest directly adjacent to each other in a vertical direction. The vertical reference lines 532 of each area captured by image detector 119 are used by the image coordination tool to line up the first projection area 501 and the second projection area 502 by aligning the vertical reference lines 532.

Figure 17:
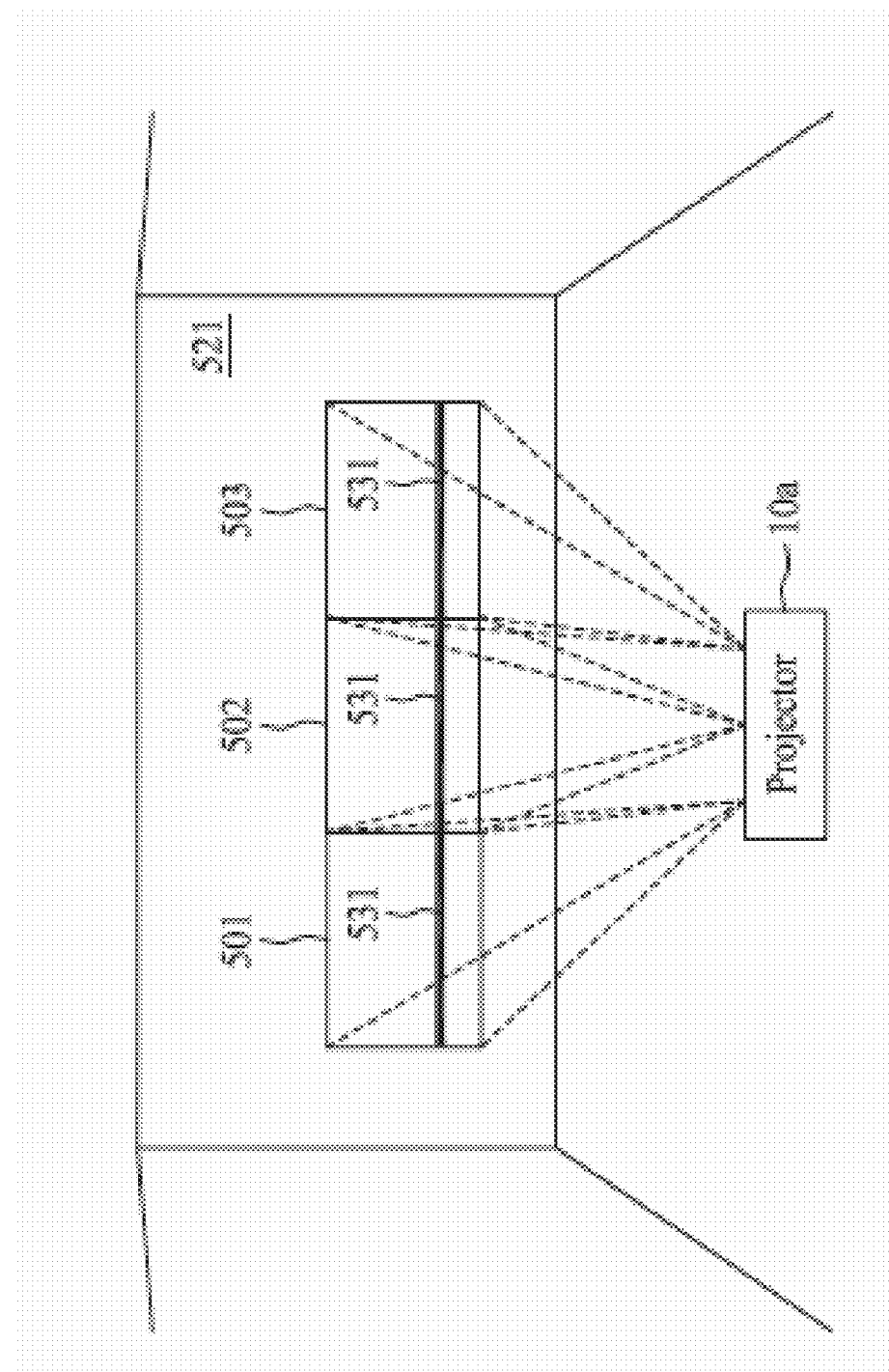

FIG. 17 shows display device 10 may project a projection image on a receiving surface 521 in accordance with one of the present embodiments. Here, display device 10 comprises at least three projection outputs 14. In these embodiments, a single video signal source is coupled to display device 10; and three projection chambers 14 are used to output image jointly in first projection area 501, second projection area 502 and a third projection area 503. In another words, each of the first projection area 501, the second projection area 502 and the third projection area 503 is for displaying portion, such as one third, of a projection image. In embodiments, horizontal reference lines 531 with graduation labels may be employed by keystone correction tool and image coordination tool to adjust the projection output matching such predetermined settings and/or digital placement of each image relative to each other. In embodiments when the projection device 10 includes a positioning interface as described above, this digital positioning control of each image provides two mechanisms for positioning a projection image.

Figure 18:
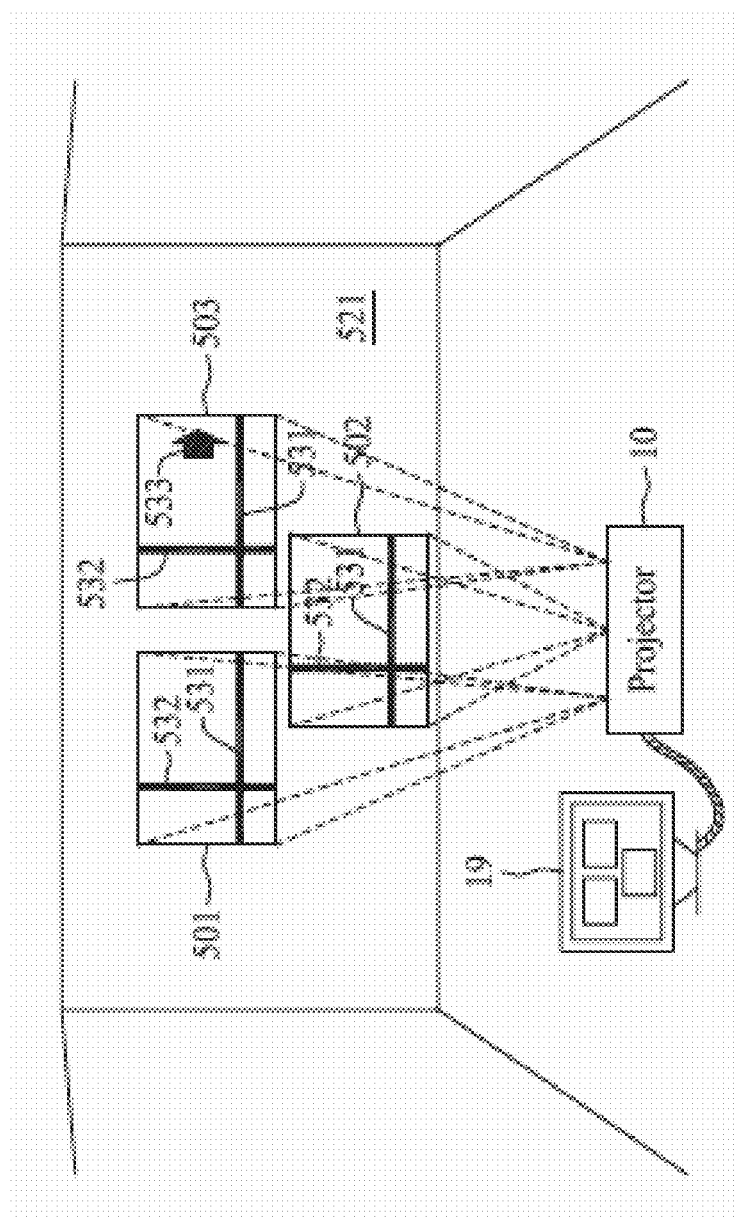

FIG. 18 shows display device 10 projects three projection images on a receiving surface 521 in accordance with one of the present embodiments. Here, display device 10 comprises at least three projection chambers 14.

In embodiments, the display device 10 uses three projection chambers 14 to project images within three projection areas. First projection area 501 and third projection area 503 are lined up horizontally while second projection area 502 is placed below the first projection area 501 and third projection area 503 as shown. In embodiments, horizontal reference lines 531 and vertical reference lines 532 with graduation labels may be employed by keystone correction tool so as to form projection areas with the same size and with reduced keystone distortion. Intersections of horizontal reference lines 531 and vertical reference line 532 may be used by image coordination tool to adjust locations of the three projection areas to match such setting or default.

In this example, a user may wish to move and locate first projection area 501, the second projection area 502 and third projection area 503 on the receiving surface 521 according to his/her preference. Here, the user may control the position of each projection areas by using OSD (On-screen display) interface 533 such as an arrow as shown in FIG. 18. In other embodiments, display device 10 incorporates a built-in screen or is able to connect to an accessory external display 19, as shown. User may drag each of the projection areas to a preferred location through GUI (Graphics-based user interface) displaying on built in screen or accessory external display 19 by pointer, such as mouse input. In other embodiments user may drag each of the projection areas by finger touch on the built-in screen or accessory external display 19 which has touch-screen function.

Figure 19:
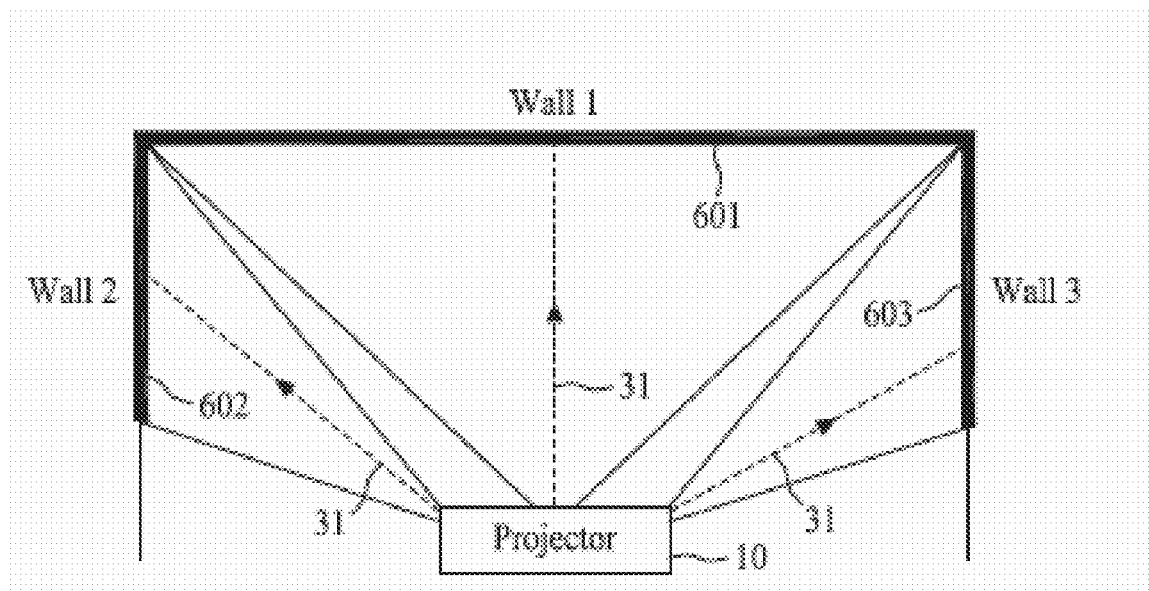
FIGS. 19-20 show various aspects of a display device projecting three projection images respectively on three receiving surfaces in accordance some of the present embodiments.

FIG. 19 shows other embodiments which display device 10 projects three projection images on three receiving surfaces—first receiving surface 601, second receiving surface 602 and third receiving surface 603 on three walls respectively. Here, display device 10 comprises at least three projection chambers 14. Each of the projection chambers projects image on one receiving surface.

As shown in FIG. 19, projection images on second receiving surface 602 and third receiving surface 603 need keystone correction due to projection paths 31 from display device 10 being not perpendicular to second receiving surface 602 and third receiving surface 603. Projection image on first receiving surface 601 may also need keystone correction. Although in FIG. 19 the projection path from display device 10 is perpendicular to first receiving surface 601, it may not be perpendicular in another cross-section or horizontally centered to Wall 1 as shown, such as in the condition that display device 10 disposed on floor; and the image on surface 601 may need vertical situation specific correction.

In embodiments while image coordination tool is applied to adjust projection images of three receiving surfaces, such as to have identical image height and being aligned with each other. Vertical reference line of keystone correction tool may be used as a base line for alignment; and the requirement of identical image height may be an instruction from image coordination tool instructing keystone correcting tool to modulate projection images as required.

In embodiments, the display device 10 is employed by a video game device for generating near-peripheral surrounding video. For example, a user sitting in front of display device 10 benefits from a full peripheral vision video game experience where objects may appear from not only the front but also the sides and be detected by peripheral vision. In these embodiments, the display device 10 may be installed near to ceiling to prevent casting a shadow of user.

Figure 20:
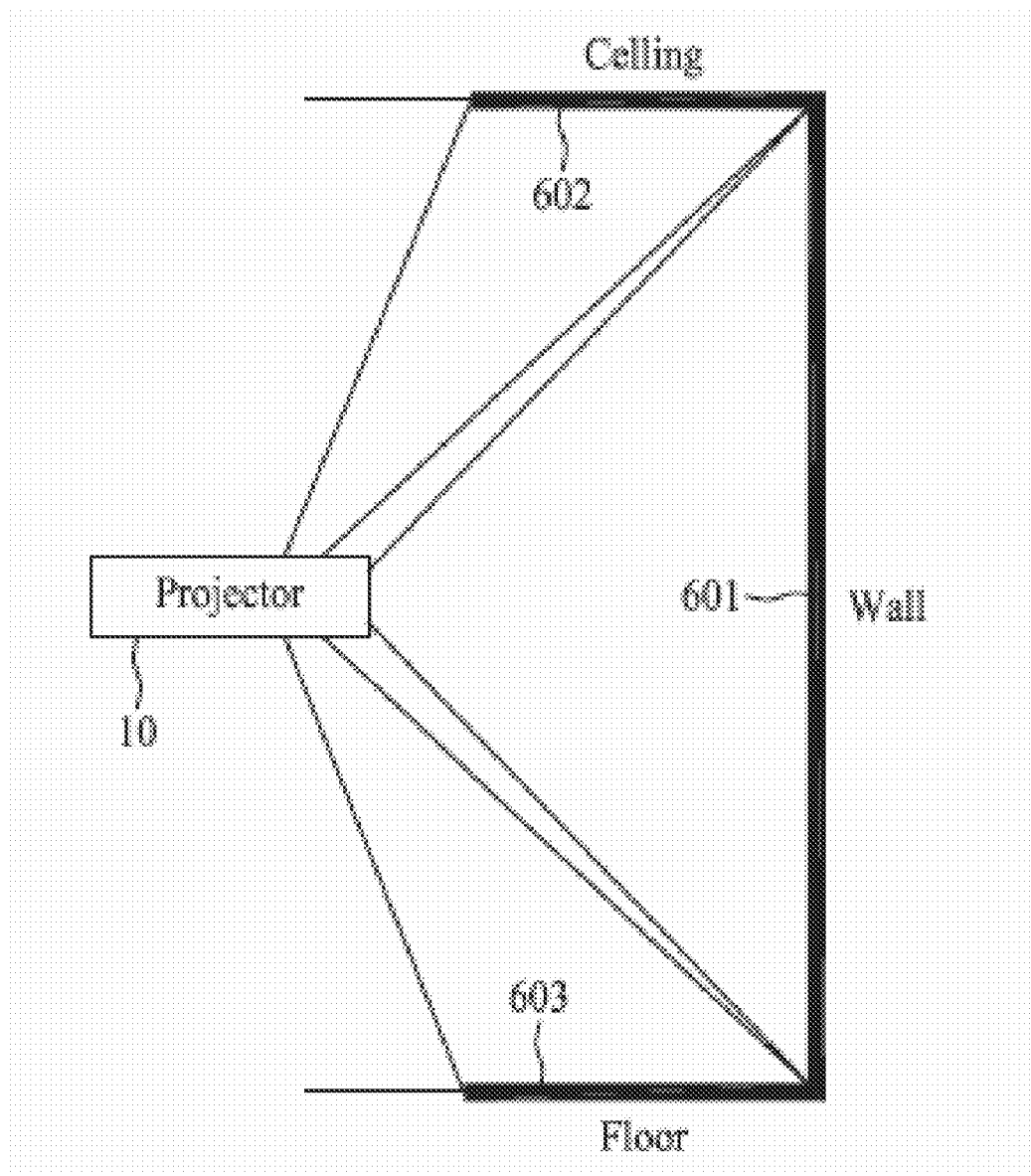

FIG. 20 shows other embodiments which display device 10 projects three projection images on a first receiving surface 601, second receiving surface 602 and third receiving surface 603. First receiving surface 601 is on a wall in front of the display device 10. Second receiving surface 602 is on ceiling; and third receiving surface 603 is on floor. Keystone correction tool and image coordination tool may be applied for adjusting sizes and positions of projection images in according to a predetermined arrangement.

In embodiments which the display device 10 employed by video game device for generating near-peripheral surrounding video, user may experience. For example, these types of embodiments may be applied in helicopter, plane and other flying (or simulation) games to form full visual feedback for a horizon change, e.g., the video ground rises or falls. Image coordination tool may be applied to adjust projection images to be projected at proper positions. Other embodiments of the three receiving surfaces may include projecting image on two walls and a ceiling, or on two walls and a floor, etc.

Figure 21:
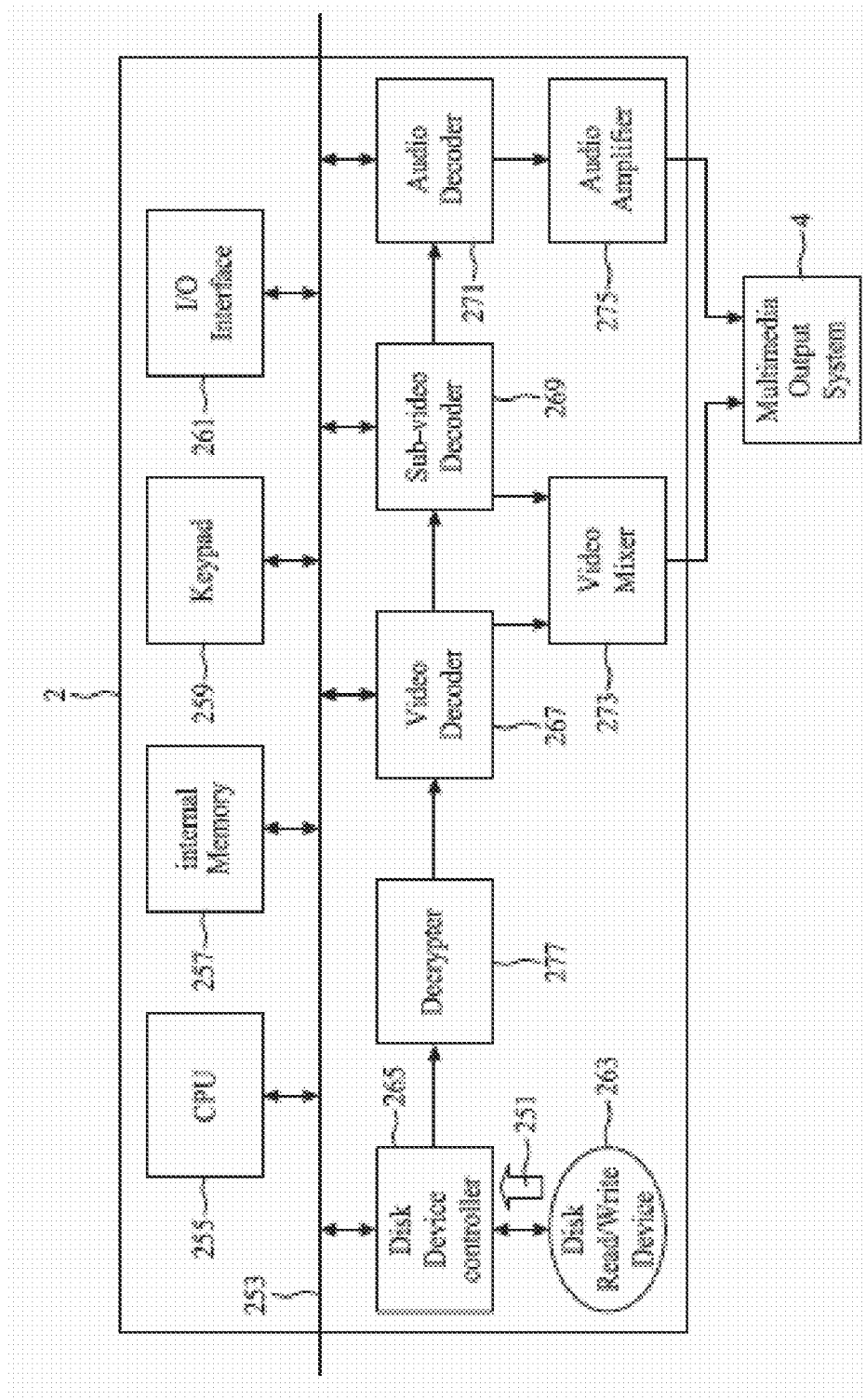
FIG. 21 illustrates an example block diagram of a content processing component in accordance with aspects of the innovation.

FIG. 21 shows an exemplary block diagram of a content processing unit 2. It is to be understood that the content processing unit 2 may have the same or similar functionality as described with regard to component 101 of FIG. 1. Multimedia output system 4 is coupled to content processing unit 2, such as a DVD player, gaming device, desktop or laptop computer or other devices being capable of providing multimedia signals, which decodes a multimedia data stream 251 and provides a video signal and an audio signal to multimedia output system 4. In embodiments, video signal includes a plurality of video channels for carrying video information to be projected by multiple projection chambers 14 of display device 10 as described above.

Content processing unit may comprises a system bus 253, a CPU 255, an internal memory 257, an control keypad 259, an I/O interface 261, a disk read/write device 263, a disk device controller 265, a video decoder 267, a sub-video decoder 269, an audio decoder 271, a video mixer 273, an audio amplifier 275 and a decrypter 277.

The CPU 255 controls the whole unit via the system bus 253. The internal memory 257 is for use in a storage area for a variety of programs such as a system control program executed by the CPU 255, a working area of the CPU 255, and a data buffer area. The keypad 259 is provided with various keys for acting as user input interface. The I/O interface 261 is for connecting external devices. The disk read/write device 263 drives, reads and writes optical storage medium such as DVD disk. The disk device controller 265 controls the disk read/write device 263 under the control of the CPU 255. The disk device controller 265 temporarily stores in the data buffer area of the internal memory 257, the multimedia data stream read out by the disk read/write device 263, and subsequently sends them to the video decoder 267, the sub-video decoder 269, and the audio decoder 271 in sequence. In addition, on the dedicated multimedia data stream path, decrypter 277 may be employed for decrypting the multimedia data stream 251 when it is encrypted.

The video decoder 267 extracts and decodes video data such as motion picture data from the multimedia data stream 251 and outputs decoded video data. The sub-video decoder 269 extracts and decodes sub-video data from the multimedia data stream 251 and outputs the still picture data. The audio decoder 271 includes an A/D converter which extracts and decodes audio data from the multimedia data stream 251 and outputs the audio data. The video mixer 273 mixes the motion picture data serving as video data decoded by the video decoder 267, and the still picture data decoded by the sub-video decoder 269 to generate reproduced video signal for display. The audio amplifier 275 amplifies the audio data, in embodiments, two channel stereo signals for L/R, decoded by the audio decoder 271. In other embodiments, it may be five or more channels according to the source multimedia data stream and the decoding ability of audio decoder 271.

Figure 22:
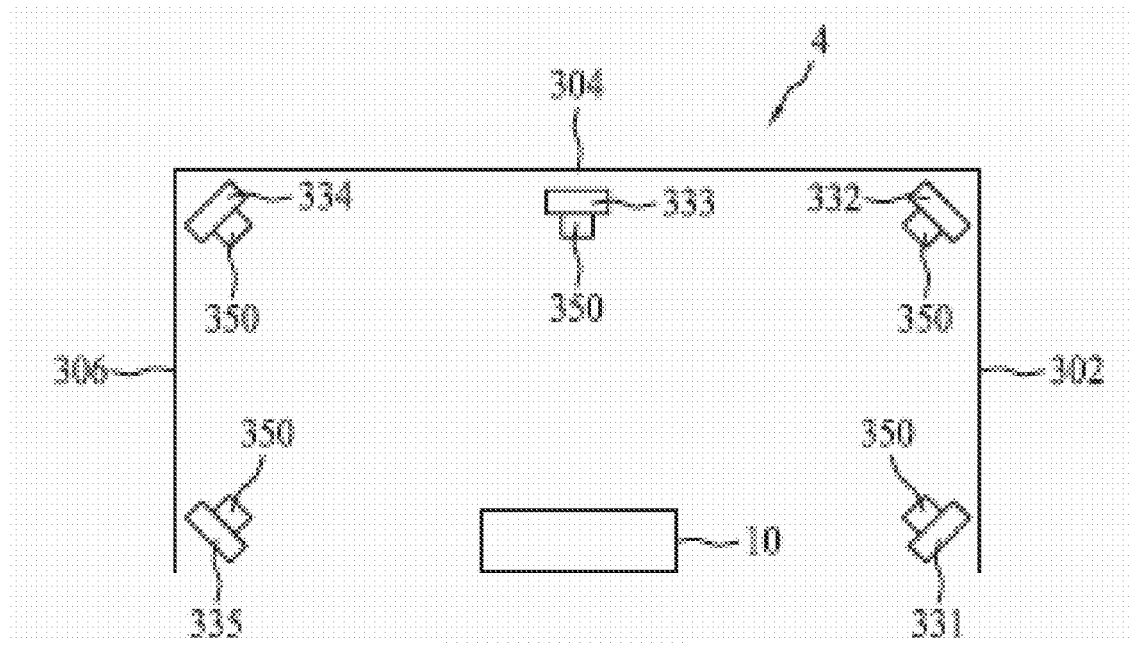
FIGS. 22-24 illustrate various example configurations of multimedia output system casting projection images and speaker arrangement in accordance with aspects.
Figure 23:
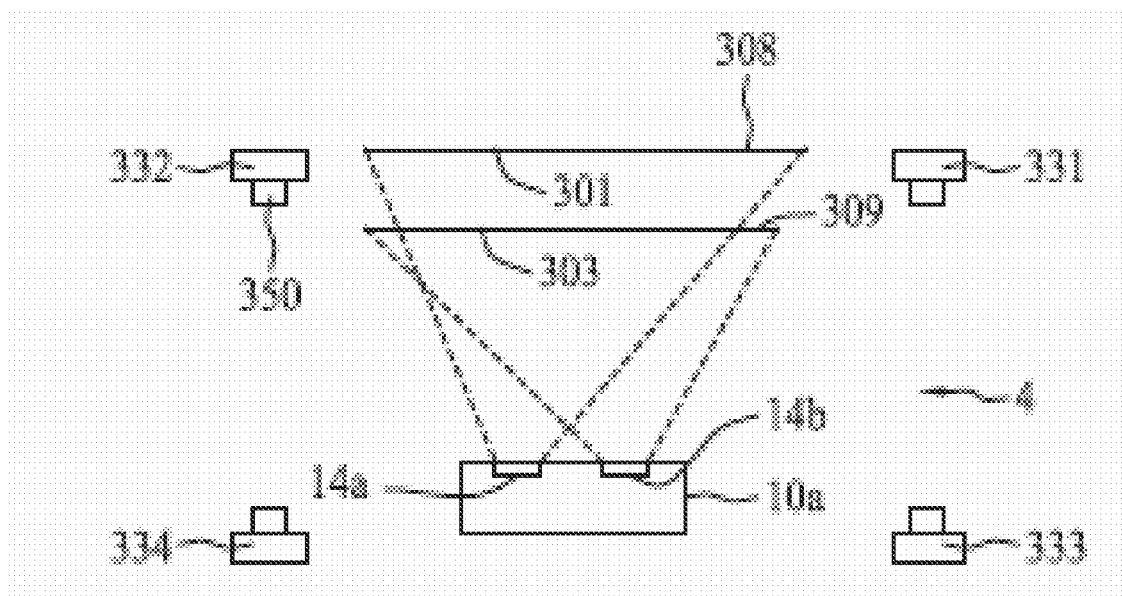
Figure 24:
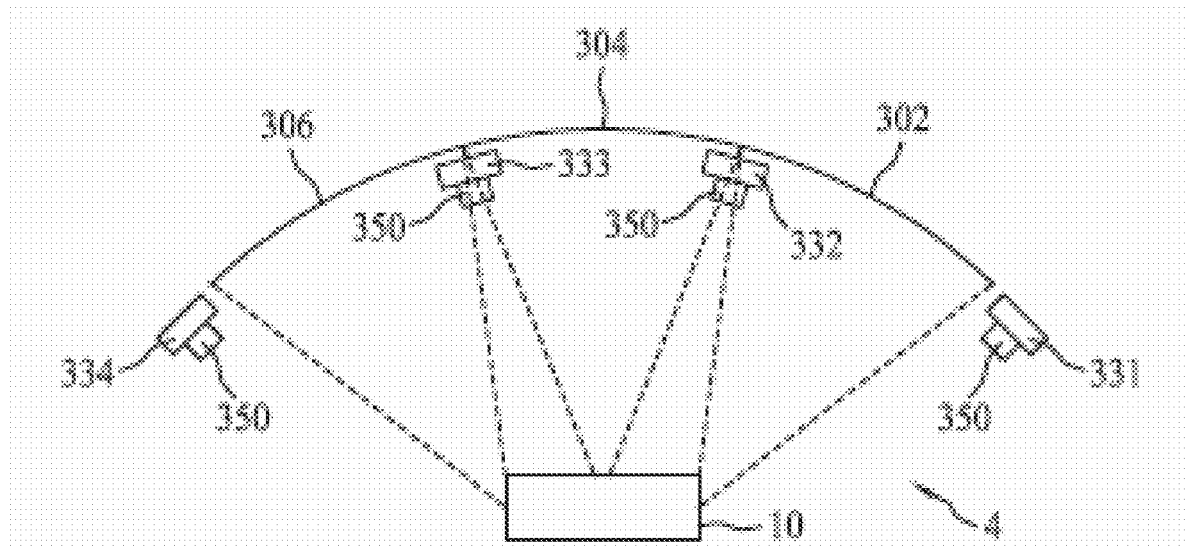

FIGS. 22 to 24 illustrate exemplary ways of spatial arrangement regarding to speakers and projection images. In FIG. 22, multimedia output system 4 uses display device 10 to project three projection images including right image 302, central image 304 and left image 306 on three receiving surfaces perpendicular to each other, which may be three adjacent walls in embodiments. The images cast on each surface may or may not occupy the full wall or space vertically and horizontally. Multimedia output system 4 also includes first speaker 331, second speaker 332, third speaker 333, fourth speaker 334 and fifth speaker 335 in the shown embodiments.

Under a condition that the audio signal from external content processing unit 2 (FIG. 21) is a single-channel audio signal, the five speakers (331-335) shown in FIG. 22 generate identical audio output. In other embodiments, the audio signal from content processing unit 2 is a five-channel audio signal, the five speakers (331-335) shown in FIG. 22 output a more stereo sound field.

In embodiments, a spatial coordination module (described infra) is embedded into the multimedia output system 2. In one practice, the video signal provided by the content processing unit 2 includes three video channels corresponding to three projection images 302-306; and the audio signal provided by the content processing unit 2 includes five audio channels being cast out by the five speakers 331-335. The speakers 331-335 may comprise an identification device 350, respectively. The identification device 350 may be a LED lamp or other luminance devices flashing light in a predetermined frequency, outputting light in a predetermined color or generating a particular pattern so as to provide identification for each speaker 331-335. The multimedia output system 4 utilize an image detector, such as image detector 119 described above or others described previously, to detect positions of speakers 331-335 and to detect positions of the three projection images 302-306.

The spatial coordination module may utilize the position information of projection images 302-306, position information of speakers 331-335 and an auto matching program included in the spatial coordination module to dispatch a specific audio channel of audio signal to a specific speaker.

The auto matching program stores various position arrangements of projection images and various position arrangements of speakers within; and it also comprises default matching plans. Once the position information of both projection images and speakers may be obtained by the auto matching program, a proper matching plan, such as the one having highest matching score, may be applied; and a proper audio/video coordination is able to be performed.

According to these embodiments, audio effect related to the right image 302 may be cast out through the first speaker 331 and the second speaker 332; audio effect related to the central image 304 may be cast out by the second speaker 332, the third speaker 333 and the fourth speaker 334; and the audio effect related to the left image 306 may be cast out by the fourth speaker 334 and the fifth speaker 335, for example.

FIG. 23 illustrates embodiments of another position arrangement of multimedia output system. Two receiving surfaces 308 and 309 parallel to each other and facing projection chambers 14a and 14b of display device, such as display device 10a shown and described above.

Receiving surface 309 may be transparent for light from left projection chamber 14a and oblique for light from right projection chamber 14b. Receiving surface 308 may reflect most of the light from left projection chamber 14a.

As a result, a user may discover front projection images 301 and rear projection image 303 simultaneously and experience a stereoscopic video. The multimedia output device may employ the spatial coordination module to coordinate rear projection image 301 with the first speaker 331 and the second speaker 332 and to coordinate front projection image 303 with the third speaker 333 and the fourth speaker 334.

As shown in FIG. 24, multimedia output system 4 uses display device, such as display device 10 described above, to project three projection images including right image 302, central image 304 and left image 306 on a arc receiving surface. Multimedia output system 4 comprises four speakers including first speaker 331, second speaker 332, third speaker 333 and fourth speaker 334 in these embodiments.

In embodiments, the video signal provided by the content processing unit 2 includes a single video channel, for example, the multimedia data stream being of a movie DVD; and each of the three projection image 302, 304 or 306 presents a part, such as one-third, of the whole video picture. The audio signal provided by the content processing unit 2 may include two audio channels which are a left audio channel and a right audio channel. First speaker 331 and second speaker 332 may be used to present sound according to the right audio channel; while third speaker 333 and forth speaker 334 may be used for the left audio channel.

The spatial coordination module may utilize image detector, such as image detector 119 of FIG. 10, to identify speakers 331-334 through detecting identification device 350 of each speaker 331-334 and to get position information of speakers 331-334; the spatial coordination module may also detect positions of right image 302, central image 304 and left image 306 and then is able to dispatch the right audio channel and the left audio channel properly by performing the auto matching program of the spatial coordination module.

In other embodiments, the spatial coordination module may include a motion detection program for enhancing spatial effect of the virtual reality space provided by multimedia output system 4 (FIG. 4). For example, motion detection information, e.g., the motion of a video object moving from right image 302 through central image 304 to right image 306 may be detected by the motion detection program; and the spatial coordination module may employ an audio modulation program to modulate sound effect, such as to emphasize sound of first speaker 331 and second speaker 332 while the video object is in the right image 302, to emphasize sound of second speaker 332 and third speaker 333 while the video object is in the central image 304, and to emphasize sound of the third speaker 333 and the fourth speaker 334 while the video object is in the left image 306.

Figure 25:
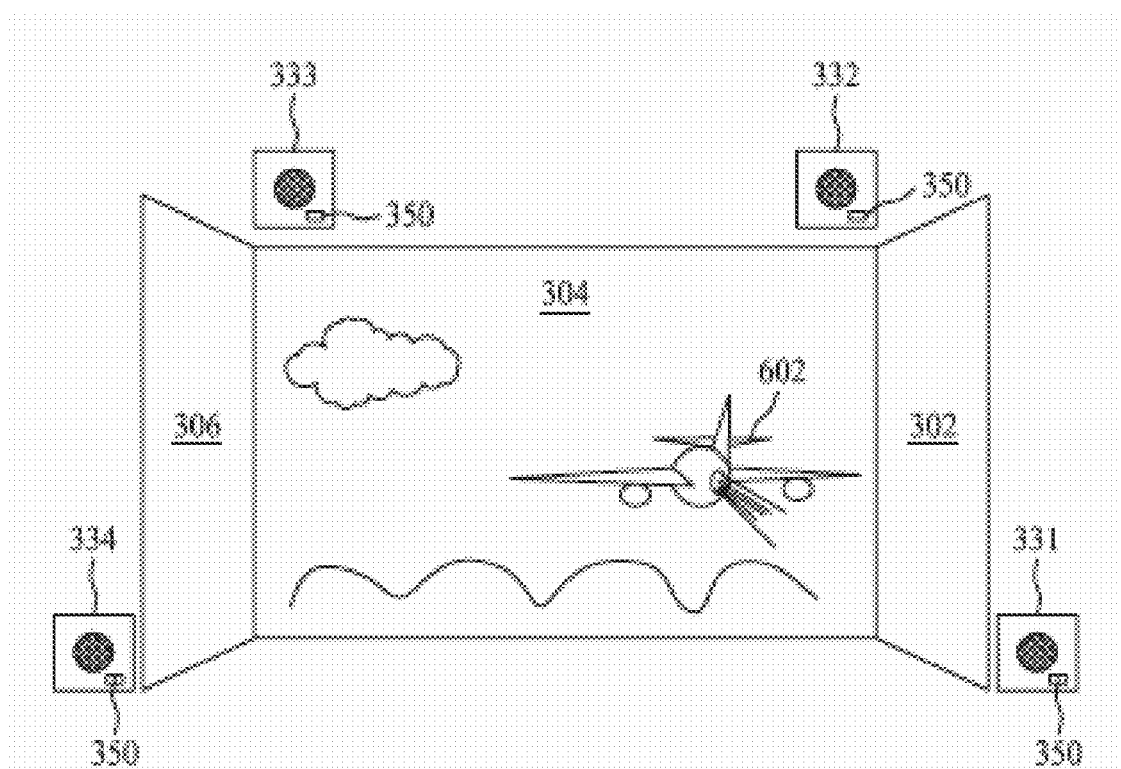
FIGS. 25-26 illustrate example video output at an earlier and later timing in accordance with aspects of the innovation.
Figure 26:
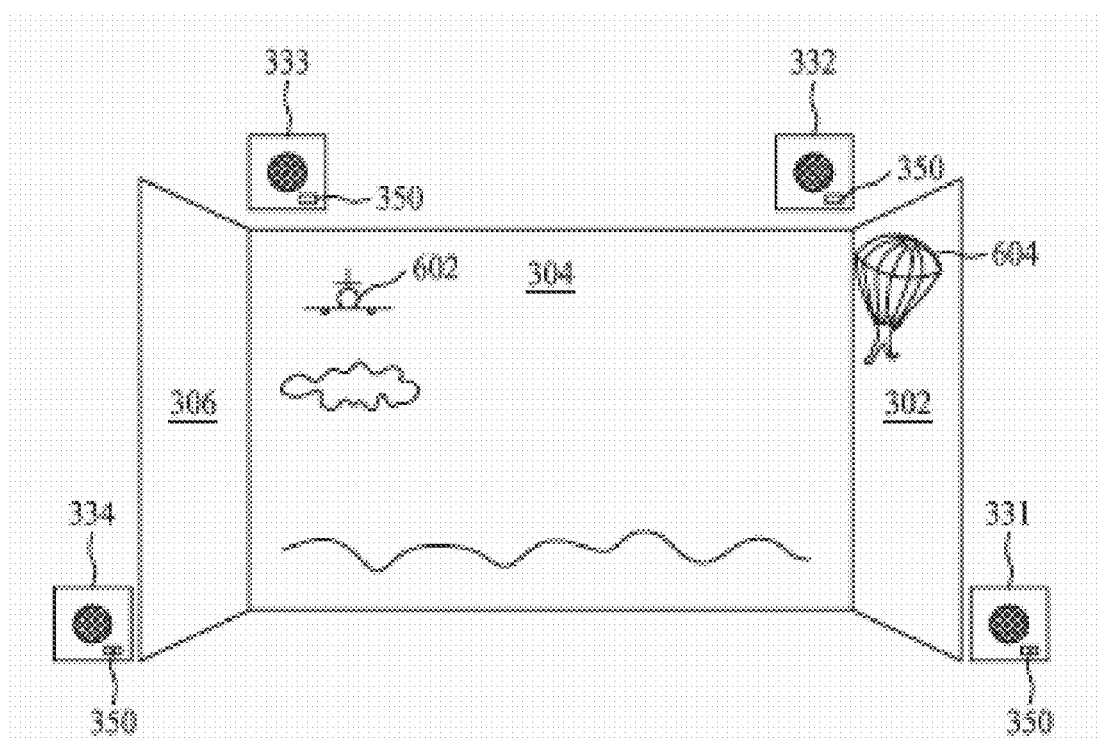

FIGS. 25 and 26 illustrate example video output at an earlier and a later timing in accordance with aspects. In embodiments, the motion of a video object 602, such as the plane as shown, moving from right part of central image 304 (FIG. 25) to left part. (FIG. 26). This motion may be detected by the motion detection program of the spatial coordination module by utilizing image detector, such as image detector 119 discussed supra. The spatial coordination module may employ the audio modulation program to modulate sound effect, such as to emphasize sound of first speaker 331 and second speaker 332 while the video object 602 in the right part of central image 304 (FIG. 25), and to emphasize sound of second speaker 333 and third speaker 334 while the video object is in the left part of central image 304 (FIG. 26).

In other embodiments, the motion detector program is able to further detect the size change in association with the motion of the video object 602 and to identify the motion not only representing a right to left movement but also a near (e.g., relative to viewer) to far movement. The spatial coordination module may employ the audio modulation program to emphasize sound of first speaker 331 and second speaker 332 while the video object 602 is near and in the right part of central image 304, and to less emphasize or even to reduce sound of third speaker 333 and the fourth speaker 334 so as to provide a simulated sound effect presenting the plan being vanishing.

In other embodiments, for example the audio signal provided by content processing unit 2 being a two-channel audio signal, first speaker 331 and second speaker 332 output audio according to right audio channel; and third speaker 333 and fourth speaker 334 output audio according to left audio channel. The motion detection program detects that the video object 602 is vanishing and then another video object 604, such as paratrooper, appears in the left image 302. The spatial coordination module may utilize the audio modulation program to emphasize the second speaker 332 for providing a sound effect which is enhanced in stereo performance comparing to default settings in the receiving audio signal. For human vision, motion detection is sensitive in periphery vision; acoustic effect of video object in periphery area such as video object 604 is able to specifically take advantage of human visual sensitivity.

Figure 27:
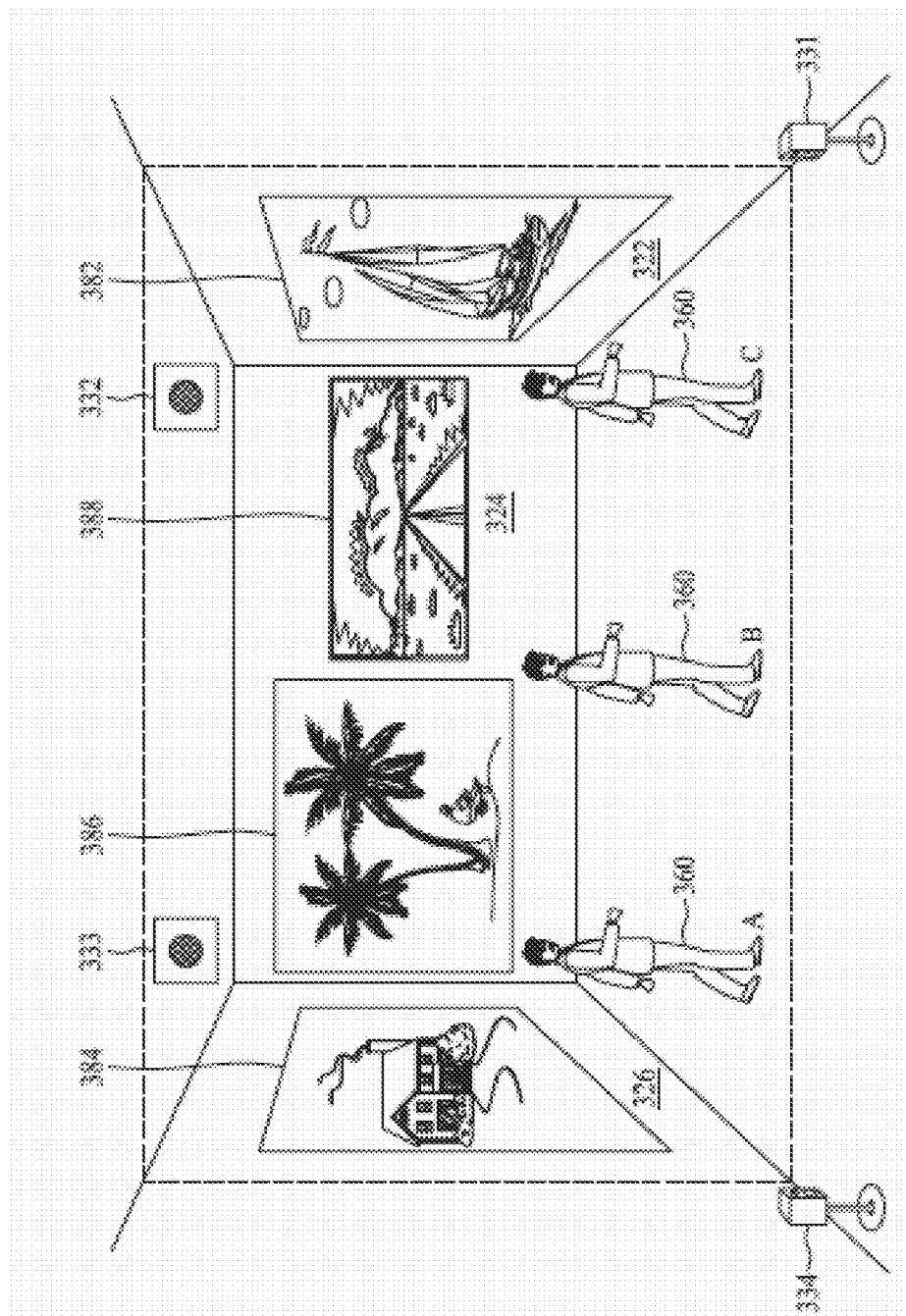
FIG. 27 illustrates example projection images displayed on receiving surfaces surrounding a user in accordance with aspects of the innovation.

FIG. 27 shows projection images displayed on receiving surfaces surrounding a user in accordance with aspects. In embodiments, the multimedia output system output video and audio to form a virtual reality space, such as a virtual show room. In the example, a tourist 360 is wandering in the virtual show room displaying first art piece 382, second art piece 384, third art piece 386 and fourth art piece 388 which are projected by display device of multimedia output system. In these embodiments, multimedia output system includes four speakers 331, 332, 333 and 334. First speaker 331 is installed near the right-bottom corner of first receiving surface 322; second speaker 332 and third speaker 333 are installed near the right-top corner and the left-top corner of second receiving surface 324 respectively, and fourth speaker 334 is installed near the left-bottom corner of third receiving surface 326.

In embodiments, the multimedia output system includes a user-position detection module which may be incorporated within spatial coordination module. The user-position detection module may obtain user-position information by employing image detector, such as image detector 119. Spatial coordination module may utilize the obtained user-position information and also utilize the position information of projection images and speakers to modulate sound effect by using audio modulation program.

In embodiments, for example, while the user-position module obtains user-position information which is at position A shown in FIG. 21, the spatial coordination module may emphasize sound of fourth speaker 334 which may output voice tourist guide in associate with second art piece 384. While the user-position module obtains a user-position information which is at position B shown in FIG. 21, the spatial coordination module may emphasize sound of second speaker 332 and third speaker 333.

In other embodiments, while the user-position module obtains user-position information which is at position C shown in FIG. 21 and all the speakers 331-334 output sound based on the same audio signal (e.g., single audio channel or multiple audio channels are both applicable).

The spatial coordination module may enlarge sound of fourth speaker 334 and third speaker 333 for providing a much stereo sound effect to tourist 360. This may specially benefit the condition that the distance from position C to the third receiving surface 326 is relatively long. Other embodiments may also achieve a more stereo sound effect is to delay sound of fourth speaker 334 and third speaker 333 by audio modulation program of the spatial coordination module.

Figure 28:
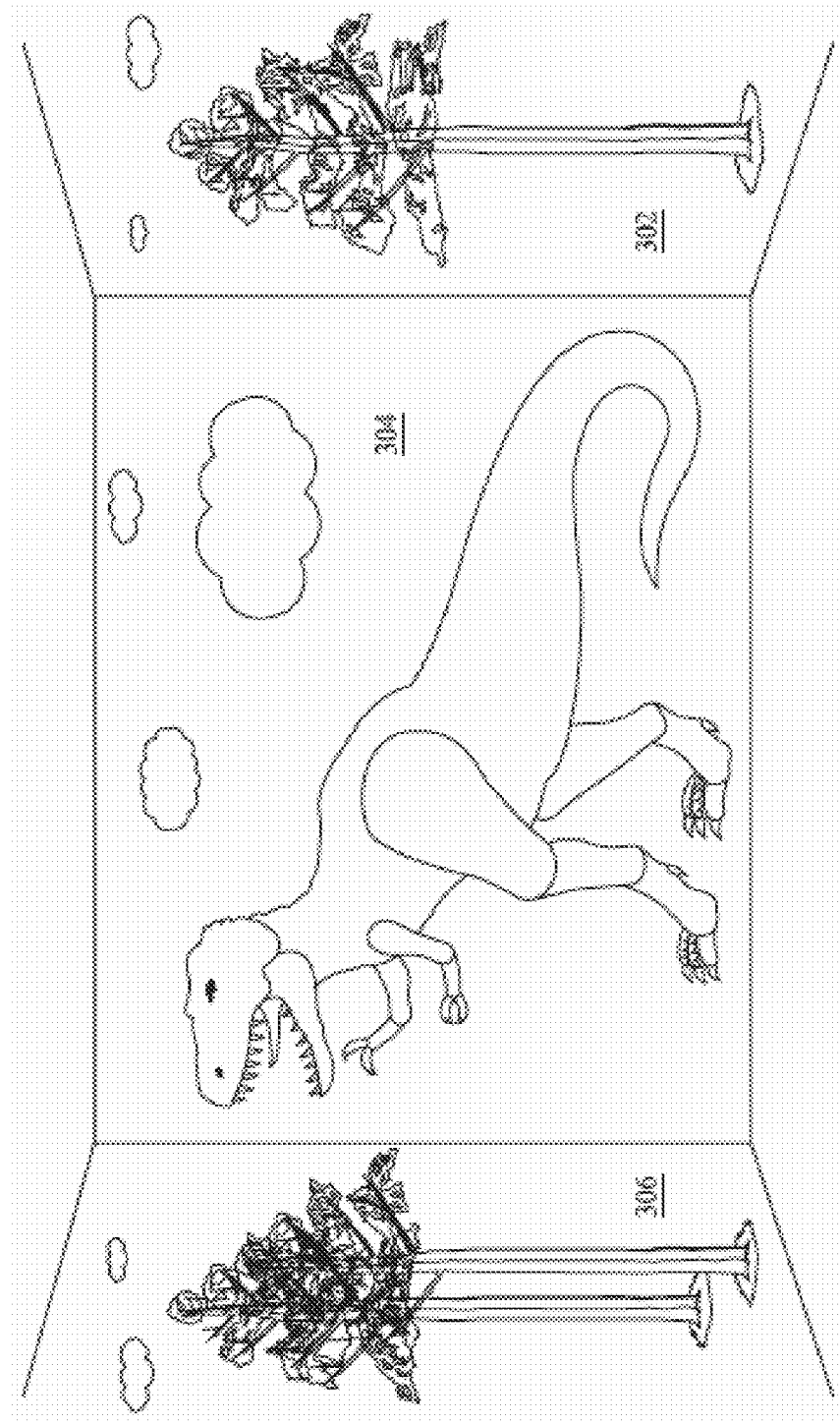
FIG. 28 illustrates an example video output in accordance with embodiments.

Turning now to FIG. 28, an exemplary video output according to embodiments is shown. For example, the spatial coordination module allocates relatively higher processing resource for the central image 304 and allocates relative lower processing resource for the subsidiary images such as the right image 302 and the left image 306; namely, the video resolution of central image 304 is higher than the video resolution of right image 302 and left image 306. This may be performed by a resolution adjustment instruction included in the spatial coordination module and may benefit system data processing.

Besides the central-weighted embodiments as described, the spatial coordination module may allocate relative higher processing resource for a predetermined angular range of user's visual fields. This may be achieved by knowledge of the video data being presented and/or utilizing an eye sensor which is coupled to control circuitry of multimedia output device and is configured to detect a direction of line of vision of a user. In the former case, for example in a video game in which the game knows and controls video output to the user, the system may make assumptions about where the user is gazing to reduce video information and processing to other parts. In the latter case, eye detection module included in the spatial coordination module may use the fovea information retrieved by the eye sensor to set up a weighted video area; and the resolution adjustment instruction may be applied to areas that outside the weighted video area so as to perform resolution adjustment, such as reducing video resolution in such area.

In embodiments, video details are reduced outside about forty degrees in angular separation from user's fovea, e.g., the line of vision. In other embodiments, video details are reduced in stages. For example, color may be reduced after twenty degrees in angular separation from user's fovea; and resolution may be diminished after forty or sixty degrees, etc. In other embodiments, user-position detection module utilizes image detector 119 to detect position and facing direction of user's head so as to provide information in associate with user's visual fields.

Figure 29:
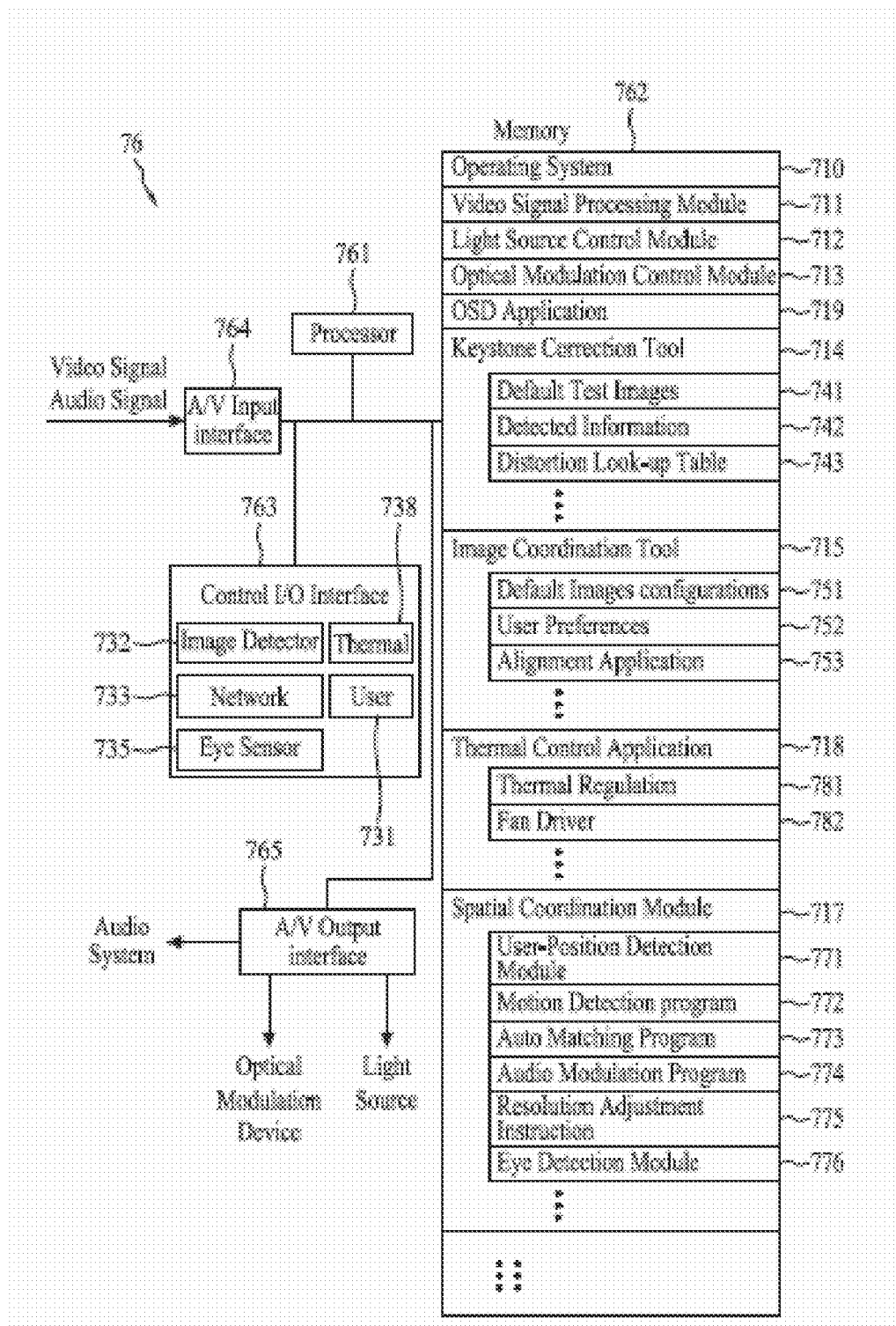
FIG. 29 illustrates an example block diagram of a control circuitry of a multimedia output system in accordance with embodiments.

FIG. 29 shows an example block diagram illustrating a controller component or control circuitry 76 of multimedia output system 4 in accordance with several embodiments. As mentioned, input/output circuitry 74 and input ports 78 collectively permit communication between multimedia output system 4 and a device that outputs video signal and audio signal, such as but not limit to content processing unit 2 shown in FIG. 21. Video signal and/or audio signal provided to control circuitry 76 may be in an analog or digital format. In some embodiments, input/output circuitry 74 and/or control circuitry 76 convert analog video signals into digital video signals suitable for digital operation of optical modulation device 102.

In other embodiments, input/output circuitry 74 may also include support software and logic for particular connector types, such as processing logic required for video signal input from S-video cabling or digital video signal. Control circuitry 76 receives video signal and/or audio signal that has been pre-processed by input/output circuitry 76 and then further processes video signal and/or audio signal so as to provide control signals to components of multimedia output system 4 for outputting projection images and audio sound effect.

In embodiments, control circuitry 76 may include a processor 761, a memory 762, a control input/output interface 763, an audio/video input interface 764 and an audio/video output interface 765. Audio/video input interface 764 couples to input/output circuitry 74 for receiving pre-processed video signal and/or audio signal from input/output circuitry 74. Audio/video output interface 765 couples to light source 64, optical modulation devices 102 and speakers for providing control signals, which are based on the video signal and/or audio signal received by control circuitry 76, and may also based on some further modulation by control circuitry 76. In embodiments, an audio amplifier may be included in the audio/video output interface 765; in other embodiments, audio amplifier may be included in input/output circuitry 74; in some other embodiments, audio amplifier may be installed in one or more speakers.

Control input/output interface 763 may include a user interface 731, an image detector interface 732, a network interface 733, an eye sensor interface 735, and a thermal interface 738 for respectively coupling to user input devices, image detector 119, a network connecting to multimedia output system 4, an eye sensor and a thermal detector 80. User input device may include embedded/built-in control button(s), keypad, display, touch screen or stick controller; or accessory external mouse, keyboard, display with or without touch-screen function, remote controller or other controller. OSD (On-screen display) control instructions may be displayed on embedded/built-in display or touch screen, external display, or on the projection image.

Processor 761 may be a commercially available processor, controller or microprocessor such as one of the Intel or Motorola family of chips for processing/calculating data based on programs, modules or data structures in memory 762.

In other embodiments, processor 761 and at least part of memory 762 are manufactured as a single chip; namely, a system on chip application. Memory 762 may include high speed random access memory and may also include non-volatile memory, such as one or more magnetic disk storage devices. Memory 762 may optionally include one or more storage devices.

The memory 762 in control circuitry 76 may store parts or all of the following programs, modules and data structures, or a subset or superset thereof: an operation system 710, a video signal processing module 711, a light source control module 712, an optical modulation control module 713, a key stone correction tool 714, an image coordination tool 715, a spatial coordination module 717, a thermal control application 718, an OSD (On-screen display) application 719, etc.

Operating system 710 includes procedures for handling various basic system services and for performing hardware dependent tasks.

OSD (On-screen display) application 719 contains control icons or figures that may be displayed on embedded/built-in display or touch screen, external display, or on the projection image; it also contains rules and instructions in associated with user's input.

Video signal processing module 711 may process the video signal from input/output circuitry 74, which may be single-channel or multiple-channel video signal depending on embodiments, so as to construct frame based control signals which may be adopted by optical modulation device 102 in each projection head 14.

Light source control module 712 may control red laser set 961, green laser set 962, blue laser set 963 and switch 8 within light source 64 in order to drive light source 64 to divert the red laser beam, the green laser beam and the blue laser beam in a predetermined sequential order to each of the three projection chambers 14.

Optical modulation control module 713 may drive optical modulation device 102. In the embodiments that optical modulation device 102 is a digital modulator such as LCD, LCoS or DMD modulator, optical modulation control module 713 provides digital driving signals to optical modulation device 102 without digital to analog transformation.

Keystone correction tool 714 may include one or more distortion reducing algorithm. It may utilize several stored default test images 741 such as those include horizontal references line 531 and/or vertical reference lines described above, and also utilize detected information 742 such as projection image feedback detected by image detector 119 to perform auto keystone correction. In embodiments, keystone correction tool 714 includes a distortion look-up table to fast define a predetermined correction parameter according to the match-up result of detected projection image feedback and default test image, which may benefit system operation loading.

Image coordination tool 715 may include one or more programs, applications, or algorithms to coordinate images to be projected by multiple projection chambers according to user's preference or default configurations. In embodiments, default image configurations 751 and/or user preferences 752 may be stored in the memory 762. Image coordination tool 715 may employ keystone correction tool 714 for coordinating multiple images in a close loop, so as to generate video output not only at target locations but also better matching desired shapes and sizes. In embodiments, an alignment application 753 included in image coordination tool 715 may be used for aligning multiple images as described supra; alignment application 753 may employ horizontal reference line 531 and/or vertical reference line 532 of keystone correction tool 714 to perform its function.

Spatial coordination module 717 may include one or more programs, applications, or algorithms to coordinate audio output and/or video output for enhancing reality of the virtual reality space output by the multimedia output system 4.

In embodiments, spatial coordination module 717 may include a user-position detection module 771, a motion detection program 772, an auto matching program 773, an audio modulation program 774, a plurality of resolution adjustment instructions 775 and an eye detection module 776, etc.

Auto matching program 773 is utilized in several described embodiments. The auto matching program 773 may store various position arrangements regarding to projection images and speakers; it may also comprises default matching plans. Once the position information of both projection images and speakers may be obtained, a proper matching plan, such as the one having highest matching score, may be applied; and proper audio/video coordination is able to be performed. For example, auto matching program 773 is able to dispatch a specific audio channel of audio signal to one or more specific speakers.

Motion detection program 772 is utilized in embodiments which also employ image detector 119; motion detection program 772 detects and generates information about motion of one or more video object being cast out. The spatial coordination module 717 utilizes such motion information for adjusting sound affect by, for example, applying audio modulation program 774 in real time.

User-position detection module 717 may be used in associated with image detector 119 for retrieving user-position information such as the described embodiments related with FIG. 27. Image detector interface 732 of control input/output interface 763 is used for applications of image detector 119. The spatial coordination module 717 utilizes such user-position information for adjusting an output sound affect by, for example, applying audio modulation program 774 in real time.

Each of the resolution adjustment instructions 775 may be utilized by the spatial coordination module 717 to adjust, such as to reduce, parts of the projection images. In some embodiments, the resolution adjustment instructions 775 are provided to video signal processing module 711 to modulate resolution of the to-be-displayed image frames, or part of the image frames. Embodiments related to FIG. 28 are those having reduced resolution at side projection images.

Eye detection module 776 may be employed to enhance flexibility of high resolution area/reduced resolution area definitions. Eye sensor coupled to control circuitry 76 via eye sensor interface 735 is configured to detect line of vision of a user. Eye detection module 776 uses the fovea information retrieved by the eye sensor to set up a weighted video area having relatively higher resolution; and the resolution adjustment instruction 775 may be applied so as to adjust resolution of areas that outside the weighted video area.

Figure 30:
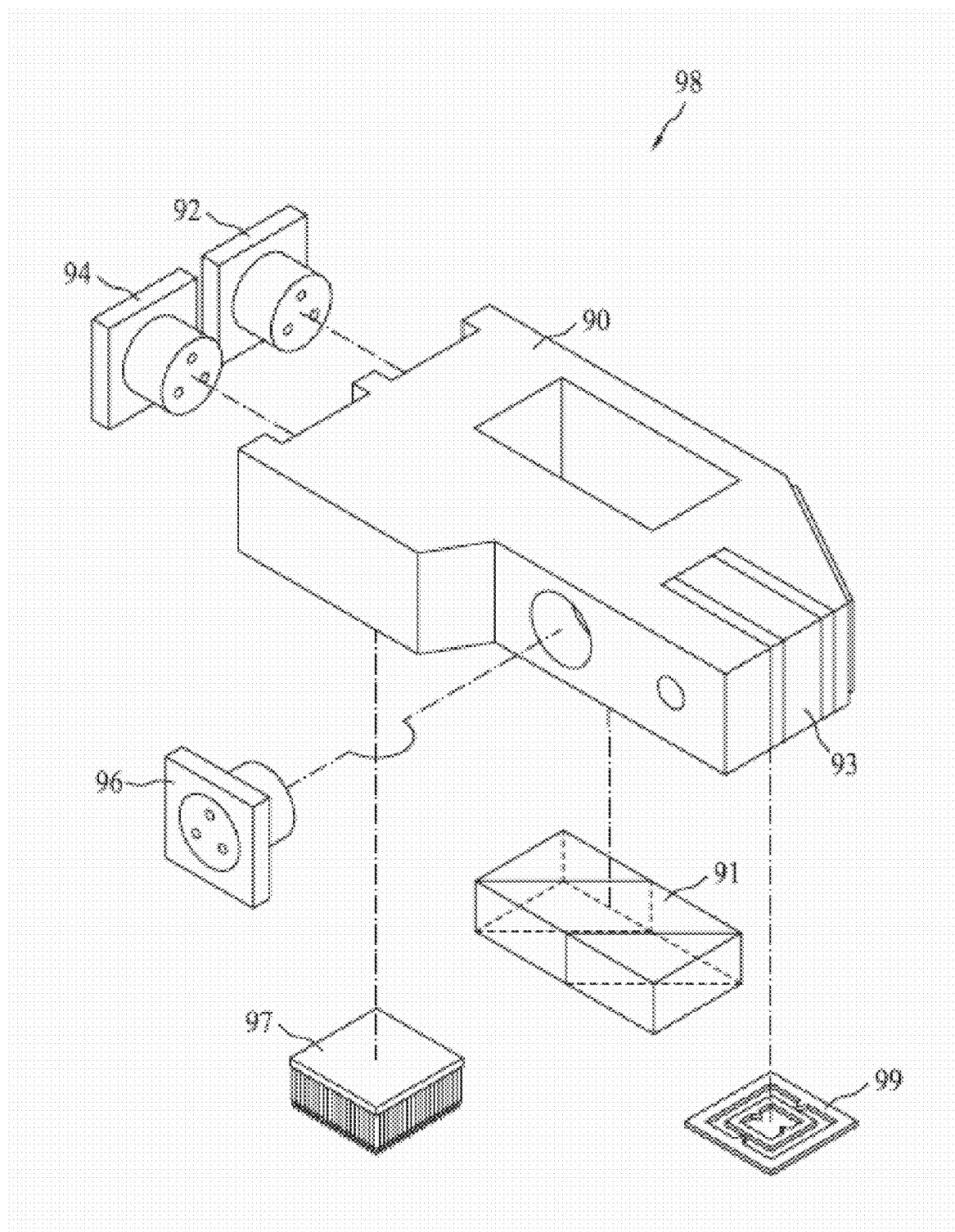
FIG. 30 illustrates another type of projector module that can be employed in one or more embodiments.

FIG. 30 illustrates another type of projector module that can be employed in some embodiments. Projector module 98 includes housing 90, red laser set 92, green laser set 94, blue laser set 96, optics 91, control circuitry 97, micro scanner 99, input/output circuitry (not shown), input/output interfaces (not shown), power supply (not shown) and projection lens system 93. Projector module 98 includes three light sources 92, 94 and 96, but with three separate outputs 95. In this regard, any of the embodiments described herein in the context of multiple chambers can be provided more generally as multiple projection outputs without constraining each light source to a chamber.

Housing 90 defines outer dimensions of projector module 98 and also provides mechanical protection for internal components of projector module 98. Housing 90 may also include air vents that permit airflow between chamber of housing 90 and external environment. Vents may also be placed on the housing 90. Power supply provides electrical power to red laser set 92, green laser set 94, blue laser set 96 and other components within projector module 98 that consume electrical power. Thus, power supply may provide electrical energy to control circuitry, input/output circuitry, fans, control circuitry 97 and micro scanner 99.

Several different embodiments of red laser set 92, green laser set 94 and blue laser set 96 may be provided. The optics 91 receives red, green and blue laser light from red laser set 92, green laser set 94 and blue laser set 96 respectively and provides three separate light outputs to micro scanner 99. The input/output circuitry provides video signal, from input/output interfaces, to control circuit 97. The control circuit 97 controls red laser set 92, green laser set 94 and blue laser set 96 respectively. During a time frame of pixel, red laser set 92, green laser set 94 and blue laser set 96 respectively generates predetermined power of laser corresponding to a predetermined gray scale of red, green or blue based on control signals from control circuitry 97.

Figure 31:
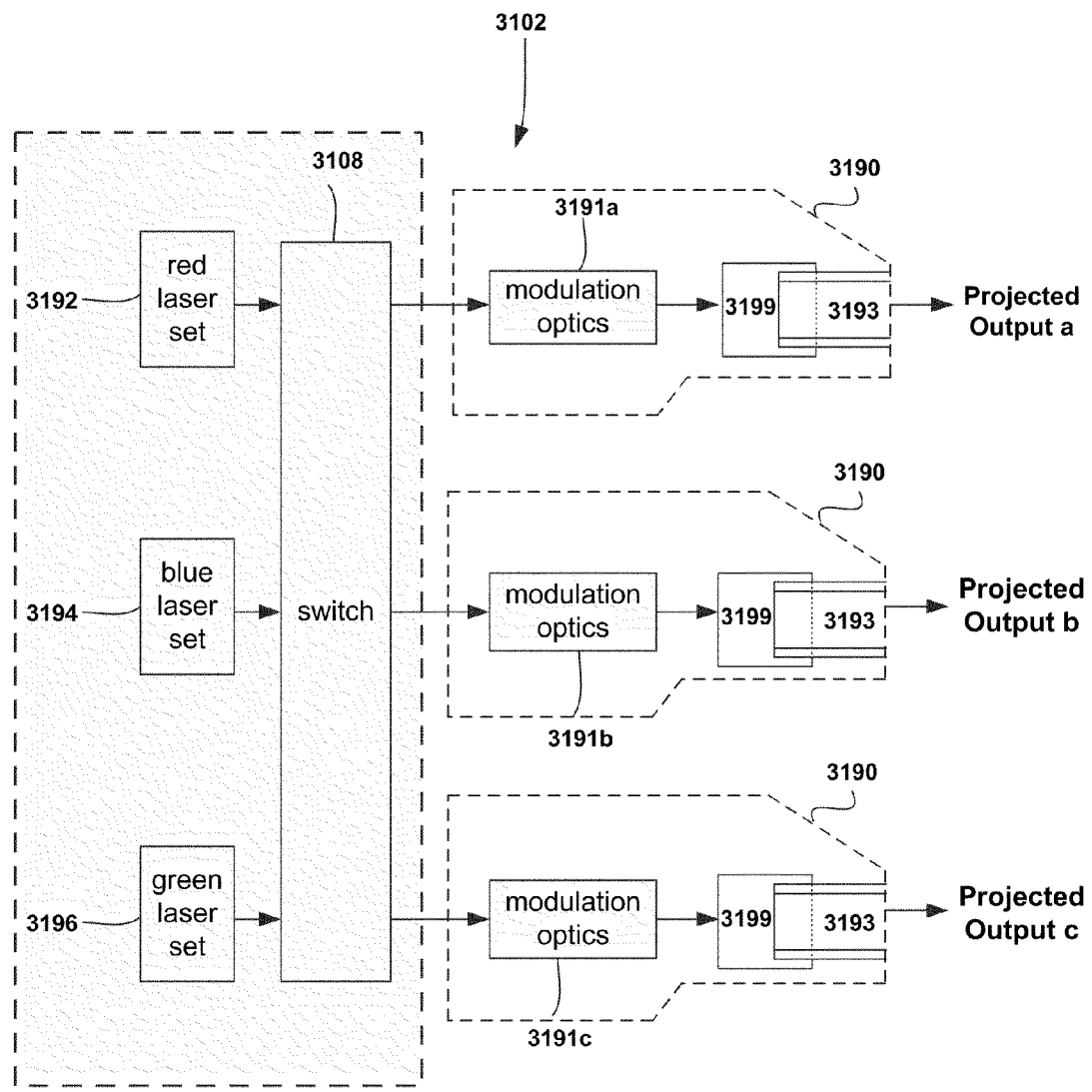
FIG. 31 illustrates yet another non-limiting embodiment in which the type of projector module depicted in FIG. 22 is employed to achieve switching among multiple outputs.

FIG. 31 illustrates another non-limiting embodiment based on the type of projector module set forth in FIG. 30. Similar to FIG. 4, projection apparatus 2402 includes separate laser (or LED) light sources 2492, 2494, 2496, which are input into switch 2408 which performs digital switching among light sources 2492, 2494, 2496. The outputs from switch 2408 from the controlled timing applied to light sources 2492, 2494, 2496 are input to projector modules 2490 respectively generating projected outputs a, b and c. Each projection module 2490 includes modulation optics 2491 a, scanner 99 and projection lens systems 2493 for generating the respective outputs a, b and c.

Although the foregoing invention has been described in some detail for purposes of clarity of understanding, those skilled in the art will recognize that various modifications may be made within the scope of the appended claims. For example, although the positional interfaces described herein have coupled to the projection chamber from the bottom, it is understood that a positional interface may couple to the projection chamber from the rear. In this case, an air duct, electrical connection and optical cabling may extend through the projection chamber to its respective functional location. The invention is, therefore, not limited to the specific features and embodiments described herein and claimed in any of its forms or modifications within the scope of the appended claims.

As described above, the innovation may employ an artificial intelligence (AI) or machine learning and reasoning component which facilitates automating one or more features in accordance with the subject innovation. The subject innovation (e.g., in connection with position detection, image/audio refinement) may employ various MLR-based schemes for carrying out various aspects thereof. For example, a process for determining a user's preference with respect to volume, brightness, image size/placement may be facilitated via an automatic classifier system and process.

A classifier is a function that maps an input attribute vector, x=(x1, x2, x3, x4, xn), to a confidence that the input belongs to a class, that is, f(x)=confidence(class). Such classification may employ a probabilistic and/or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence may be employed. Classification as used herein also is inclusive of statistical regression that is utilized to develop models of priority.

As will be readily appreciated from the subject specification, the subject innovation may employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to automatically learn and perform a number of functions, including but not limited to determining according to a predetermined criteria when to adjust video or audio based upon user perspective, where a user is located, where a user is looking, etc.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a projection display device configured to project a plurality of images onto at least one receiving surface;
    an images detector component configured to detect at least one position of a subset of the plurality of images on the at least receiving surface and to detect respective positions of a plurality of speakers relative to the subset of the plurality of images based on optical outputs projected from the plurality of speakers; and
    a spatial coordination component configured to coordinate audio output to the plurality of speakers based on the detected at least one position of the subset of the plurality of images on the at least one receiving surface and the respective positions of the plurality of speakers.

2. The system of claim 1, wherein the audio output is surround sound audio.

3. The system of claim 1, further comprising a motion detection component configured to employ an image capture device to detect motion of the subset of the plurality of images on the at least one receiving surface.

4. The system of claim 3, wherein the spatial coordination component is further configured to coordinate the audio output to the plurality of speakers based on the detected motion of the subset of the plurality of images on the at least one receiving surface.

5. The system of claim 1, wherein the image detector component is further configured to detect at least one viewer position of at least one viewer relative to the at least one receiving surface, and the spatial coordination component is further configured to coordinate the audio output to the plurality of speakers based on the detected at least one viewer position.

6. The system of claim 1, further comprising:
    an eye detection component configured to detect a focal position on the at least one receiving service on which a vision is focused,
    wherein the spatial coordination component is further configured to adjust video output parameters in at least two areas surrounding the detected focal position, a first area of the at least two areas includes an area outside of a first angular range of visual field surrounding the detected focal position, and a second area of the at least two areas includes an area outside of a second angular range of the visual field different from the first angular range.

7. The system of claim 6, wherein first video output parameter comprises a reduced color level in the first area.

8. The system of claim 6, wherein a second video output parameter comprises a reduced resolution in the second area.

9. A non-transitory computer-readable medium having instructions stored thereon that, in response to execution, cause at least one device including at least one processor to perform operations, comprising:
    detecting at least one position of a subset of a plurality of images projected onto at least one receiving surface;
    detecting a plurality of positions of a plurality of speakers relative to the subset of the plurality of images based on optical outputs projected from the plurality of speakers; and
    coordinating audio output to the plurality of speakers based on the detected at least one position of the subset of the plurality of images on the at least one receiving surface and the plurality of positions of the plurality of speakers.

10. The non-transitory computer-readable medium of claim 9, wherein the coordinating the audio output includes coordinating surround sound audio.

11. The non-transitory computer-readable medium of claim 9, the operations further comprising detecting, via an image capture device, motion of the subset of the plurality of images on the at least one receiving surface.

12. The non-transitory computer-readable medium of claim 11, wherein the coordinating includes coordinating the audio output to the plurality of speakers based on the detected motion of the subset of the plurality of images on the at least one receiving surface.

13. The non-transitory computer-readable medium of claim 9 further comprising detecting a position of at least one viewer relative to the at least one receiving surface, wherein the coordinating includes coordinating the audio output to the plurality of speakers based on the detected position of the at least one viewer.

14. The non-transitory computer-readable medium of claim 9, the operations further comprising:
   detecting an eye position on the at least one receiving service to which a vision is focused; and
   adjusting video output parameters in at least two areas surrounding the detected eye position, wherein a first area of the at least two areas includes and area outside of a first angular range of visual field surrounding the detected eye position and a second area of the at least two areas includes an area outside of a second angular range of the visual field different from the first angular range.

15. The non-transitory computer-readable medium of claim 14, wherein the adjusting the video output parameters comprises adjusting a first video output parameter that reduces a color level in the first area.

16. The non-transitory computer-readable medium of claim 14, wherein the adjusting the video output parameters comprises adjusting a second video output parameter that reduces a resolution in the second area.

17. A method ncomprising:
   detecting, by a system including at least one processor, at least one position of a subset of plurality of images projected onto at least one receiving surface;
   detecting respective positions of a plurality of speakers relative to the subset of the plurality of images based on optical outputs projected from the plurality of speakers; and
   coordinating audio output to the plurality of speakers based on the detected at least one position of the subset of the plurality of images on the at least one receiving surface and the respective positions of the plurality of speakers.

18. The method of claim 17, further comprising detecting, via an image capture device, motion of the subset of the plurality of images on the at least one receiving surface.

19. The method of claim 18, wherein the coordinating includes coordinating the audio output to the plurality of speakers based on the detected motion of the subset of the plurality of images on the at least one receiving surface.

20. The method of claim 17, further comprising detecting a viewer position of at least one viewer relative to the at least one receiving surface, wherein the coordinating includes coordinating the audio output to the plurality of speakers based on the detected viewer position.

21. The method of claim 17, further comprising:
   detecting a location on the at least one receiving service to which a vision is focused; and
   adjusting video output parameters in at least two areas surrounding the detected location, wherein a first area of the at least two areas includes an area outside of an first angular range of a visual field surrounding the detected location and a second area of the at least two areas includes an area outside of an second angular range, different from the first angular range, of the visual field.

22. The method of claim 21, wherein the adjusting the video output parameters comprises reducing a color level in the first area.

23. The method of claim 21, wherein the adjusting the video output parameters comprises reducing a resolution in the second area.

24. A system comprising:
   means for detecting at least one position of a subset of a plurality of images projected onto at least one receiving surface;
   means for detecting positions of a plurality of speakers relative to the subset of the plurality of images based on optical outputs projected from the plurality of speakers; and
   means for coordinating audio output to the plurality of speakers based on the detected at least one position of the subset of the plurality of images on the at least one receiving surface and the positions of the plurality of speakers.

* * * * *